US012530465B2

United States Patent
de Nijs et al.

(10) Patent No.: US 12,530,465 B2
(45) Date of Patent: Jan. 20, 2026

(54) AUTOMATED PREDICTION OF CYBERSECURITY VULNERABILITIES

(71) Applicant: Bugcrowd Inc., San Francisco, CA (US)

(72) Inventors: Gilein de Nijs, Boring, OR (US); Michael Katsevman, San Francisco, CA (US); Damien Michael Radford, Lafayette, CA (US); Casey John Ellis, Lafayette, CA (US)

(73) Assignee: Bugcrowd Inc., San Francisco, CA (US)

( * ) Notice: Subject to any disclaimer, the term of this patent is extended or adjusted under 35 U.S.C. 154(b) by 283 days.

(21) Appl. No.: 17/370,712

(22) Filed: Jul. 8, 2021

(65) Prior Publication Data

US 2023/0019180 A1    Jan. 19, 2023

(51) Int. Cl.
| | |
|---|---|
| *H04L 9/00* | (2022.01) |
| *G06F 16/2455* | (2019.01) |
| *G06F 16/901* | (2019.01) |
| *G06F 21/57* | (2013.01) |
| *H04L 67/133* | (2022.01) |

(52) U.S. Cl.
CPC ...... *G06F 21/577* (2013.01); *G06F 16/24568* (2019.01); *G06F 16/9024* (2019.01); *H04L 67/133* (2022.05)

(58) Field of Classification Search
CPC .......................... G06F 21/577; G06F 16/24568
USPC .......................................................... 726/25
See application file for complete search history.

(56) References Cited

U.S. PATENT DOCUMENTS

| | | | |
|---|---|---|---|
| 6,324,656 B1 | 11/2001 | Gleichauf et al. | |
| 9,413,780 B1* | 8/2016 | Kaplan | G06Q 30/0208 |
| 9,846,780 B2 | 12/2017 | Tonn et al. | |
| 10,817,602 B2 | 10/2020 | Ladnai et al. | |
| 2003/0070003 A1 | 4/2003 | Chong et al. | |
| 2007/0199050 A1 | 8/2007 | Meier | |
| 2008/0040308 A1* | 2/2008 | Ranganathan | G06F 16/284 |
| 2017/0046519 A1* | 2/2017 | Cam | G06N 7/01 |
| 2017/0063910 A1 | 3/2017 | Muddu et al. | |

(Continued)

OTHER PUBLICATIONS

AliasIO, "wappalyzer: Identify technology on websites", GitHub (https://github.com/AliasIO/wappalyzer), Dec. 28, 2020, GitHub, San Francisco, CA, USA.

(Continued)

*Primary Examiner* — Christopher J Brown
(74) *Attorney, Agent, or Firm* — Asif Ghias

(57) ABSTRACT

Techniques are disclosed for predicting cybersecurity vulnerabilities automatically in IT assets/targets based on known vulnerabilities of various available technologies/products. This is accomplished by loading and linking one or more ontologies in a graph database containing vulnerability information about the technologies. The assets/targets preferably belong to a bug-bounty program. An optional discovery tool maps the attack surface of each target. A profiler collects the various technologies or traits used by the target and links them to the target. Then the graph database is queried to predict the cybersecurity vulnerabilities associated with the traits and consequently with the targets. The system is preferably implemented with a service-oriented architecture (SOA) so feedback/predictions can be provided to the user in near/real-time.

18 Claims, 9 Drawing Sheets

(56) References Cited

U.S. PATENT DOCUMENTS

| | | | |
|---|---|---|---|
| 2017/0324763 A1* | 11/2017 | Vasudevan | H04L 63/1433 |
| 2018/0077193 A1* | 3/2018 | Roytman | H04L 63/1433 |
| 2018/0124097 A1 | 5/2018 | Tiwari et al. | |
| 2018/0205755 A1* | 7/2018 | Kavi | G06F 21/577 |
| 2019/0199736 A1 | 6/2019 | Howard et al. | |
| 2019/0370475 A1 | 12/2019 | Tsokos et al. | |
| 2020/0175173 A1* | 6/2020 | Krishnamoorthy | G06F 21/577 |
| 2020/0356675 A1* | 11/2020 | Shakarian | G06F 18/24 |
| 2021/0248443 A1* | 8/2021 | Shu | G06F 16/9024 |
| 2021/0258791 A1* | 8/2021 | Jochem Sanz | H04W 12/66 |
| 2022/0237185 A1* | 7/2022 | Portisch | G06F 16/2465 |

OTHER PUBLICATIONS

Bugcrowd, "Vulnerability Rating Taxonomy (VRT) Version 1.9", Bugcrowd (https://bugcrowd.com/vulnerability-rating-taxonomy), May 22, 2020, Bugcrowd, San Francisco, CA, USA.

Mitre CVE, "Common Vulnerabilities and Exposures (CVE)—Search CVE List", The MITRE Corporation (https://cve.mitre.org/cve/search_cve_list.html), Dec. 9, 2020, The MITRE Corporation, McLean, VA, USA.

Mitre CWE, "Common Weakness Enumeration (CWE) Version 4.3", The MITRE Corporation (https://cwe.mitre.org), Dec. 10, 2020, The MITRE Corporation, McLean, VA, USA.

Neuhaus, Stephen et al., "Security Trend Analysis with CVE Topic Models", IEEE, Sep. 1, 2010, 10 pgs.

Nist NVD, "Official Common Platform Enumeration (CPE) Dictionary", National Vulerablity Database (NVD) (https:/nvd.nist.gov), Dec. 28, 2020, NIST, Gaithersburg, MD, USA.

Offensive Security, "The Exploit Database: Offensive Security Exploit Database Archive", Offensive Security, Jul. 27, 2016, 12 pgs., http://www.exploit-db.com/google-hacking-database/.

Owasp, "In-depth Attack Surface Mapping and Asset Discovery (Amass)", GitHub (https://github.com/OWASP/Amass), Dec. 28, 2020, GitHub, San Francisco, CA, USA.

Silk, "The Linked Data Integration Framework", University of Mannheim (silkframework.org), Mar. 26, 2021, University of Mannheim, Mannheim, Germany.

* cited by examiner

AUTOMATED PREDICTION OF CYBERSECURITY VULNERABILITIES

REFERENCE TO COMPUTER PROGRAM LISTINGS APPENDIX

This application includes a computer program listings appendix containing files in ASCII text file format and submitted via EFS-Web. The entire contents of the computer program listings appendix including below named files are incorporated by reference herein in their entireties in this application. The name, size, creation date and a brief description of the files contained in the computer program listings appendix are provided in Table 1 below.

Note that prior to uploading via EFS-Web, the ".json" extensions of the original files referenced in this disclosure were changed "_json.txt".

TABLE 1

Name, size, creation date and a brief description of the files contained in the submitted computer program listings appendix.

| Name of the File | Size of the File (bytes) | Date | Brief Description |
| --- | --- | --- | --- |
| 1. cwe_schema_json.txt | 1,720 | Jul. 8, 2021 | Schema of Mapping from Vulnerability Rating Taxonomy (VRT) to Common Weakness Enumeration (CWE) |
| 2. cwe_json.txt | 11,061 | Jul. 8, 2021 | Mapping from Vulnerability Rating Taxonomy (VRT) to Common Weakness Enumeration (CWE) |

FIELD OF THE INVENTION

This invention relates generally to cybersecurity and specifically to techniques related to crowdsourced cybersecurity by automated tooling, ontologies and graph databases.

BACKGROUND ART

The detection of IT vulnerabilities and IT security remains an area of active interest among government agencies, and private sector entities, both large and small, private or public. The news of vulnerability exploits, and hacking of IT assets is a familiar phenomenon to most business professionals in today's interconnected world. Unsurprisingly, a lot of attention and focus has been devoted by many organizations and academic institutions in developing platforms, tools and ideas that can detect vulnerabilities and misconfigurations in an organization's IT infrastructure.

A timely detection of the vulnerabilities/bugs in an IT infrastructure is essential for their proper and timely remedy/fix. As a consequence of timely fixes of these vulnerabilities, their exploitation by adversaries can be prevented. Otherwise, such exploitation can have catastrophic consequences for the respective businesses, organizations and/or their customers/partners.

The article entitled "Using Crowdsourcing for Collecting Information about Security Vulnerabilities" by Infosec Institute, dated 2013 explores the possibilities for using crowdsourcing for collecting information about security vulnerabilities, such as software bugs. In particular, the article discusses online competitions in which participants try to find out security vulnerabilities in software applications, collecting information about security from consumers and collection information about security vulnerabilities from the web.

The article entitled "Security Trend Analysis with CVE Topic Models" by Neuhaus, dated 2009 explores the vulnerability reports in the Common Vulnerability and Exposures (CVE) database by using topic models on their description texts to find prevalent vulnerability types and new trends semi-automatically. In their study of the 39,393 unique CVEs until the end of 2009, they identify the following trends, given here in the form of a weather forecast:

PHP: declining, with occasional SQL injection.
Buffer Overflows: flattening out after decline.
Format Strings: in steep decline.
SQL Injection and XSS: remaining strong, and rising.
Cross-Site Request Forgery: a sleeping giant perhaps, stirring.
Application Servers: rising steeply.

Reference entitled "Offensive Security Exploit Database Archive" dated Jul. 27, 2016 at website https://exploit-db.com is an exploits database. The database is an archive of exploits and is maintained by Offensive Security. According to the website, Offensive Security is an information security training company that provides various Information Security Certifications as well as high end penetration testing services. The Exploit Database is a non-profit project that is provided as a public service by Offensive Security.

U.S. Pat. No. 9,846,780 B2 to Tonn et al. teaches techniques for providing computer security vulnerability intelligence. Their techniques include obtaining distributable vulnerability data that comprises, for each of a plurality of software packages and associated vulnerabilities, threat mitigation information and a threat priority parameter. The distributable vulnerability data is derived from an intelligence graph including a plurality of fundamental instance nodes, a plurality of document nodes, and a plurality of edges. The techniques also include identifying installed software packages on a computer system. They also include correlating a plurality of the installed software packages with the distributable vulnerability data to obtain a plurality of installed software packages and associated vulnerabilities. They further include ordering at least some of the plurality of installed software packages and associated vulnerabilities according to threat priority parameters. An ordered plurality of installed software packages and associated vulnerabilities is obtained, thus providing mitigation information for the ordered plurality of installed software packages and associated vulnerabilities.

U.S. Pat. No. 10,817,602 B2 to Ladnai et al. discloses a data recorder that stores endpoint activity on an ongoing basis as sequences of events that causally relate computer objects such as processes and files. The patterns within this event graph can be used to detect the presence of malware on the endpoint. The underlying recording process may be dynamically adjusted in order to vary the amount and location of recording as the security state of the endpoint changes over time.

U.S. Patent Publication No. 2017/0063910 A1 to Muddu et al. describes a security platform for detecting security related anomalies and threats in a computer network environment. The security platform is "big data" driven and employs machine learning to perform security analytics. The security platform performs user/entity behavioral analytics (UEBA) to detect the security related anomalies and threats, regardless of whether such anomalies/threats were previously known. The security platform can include both real-time and batch paths/modes for detecting anomalies and threats. By visually presenting analytical results scored with risk ratings and supporting evidence, the security platform enables network security administrators to respond to a detected anomaly or threat, and to take action promptly.

U.S. Pat. No. 10,205,735 B2 to Apostolopulos discloses a framework that combines multiple sources of information and security knowledge in order to detect risky behaviors and potential threats. In some examples, the input can be anomaly events or simply regular events. The entities associated with the activities can be grouped into smaller time units, e.g., per day. The riskiest days of activity can be found by computing a risk score for each day and according to the features in the day. A graph can be built with links between the time units. The links can also receive scoring based on a number of factors. The resulting graph can be compared with known security knowledge for adjustments. Threats can be detected based on the adjusted risk score for a component (i.e., a group of linked entities) as well as a number of other factors.

A shortcoming of the prior art teachings is that they do not teach automatic profiling of remote assets for acquiring a set of technologies for which to gather existing vulnerabilities. They further do not describe predicting exploitable vulnerabilities based on this information. They further do not describe any prediction based on known vulnerabilities. Furthermore, the tools of the prior art are manual and lack any automated processing of the output to gather information, nor are they part of an infrastructure that automatically initiates them.

OBJECTS OF THE INVENTION

In view of the shortcomings of the prior art, it is an object of the present invention to disclose techniques for automatically predicting vulnerabilities in target assets based on known vulnerabilities.

It is further an object of the invention to automatically map the attack surface of an asset of interest by discovering additional assets underlying a target asset.

It is also an object of the invention to profile technologies and traits of assets and predict vulnerabilities in target assets based on the vulnerabilities known in the profiled traits of the asset.

It is yet another object of the invention to provide an automatic and real-time or near-real-time infrastructure/platform for predicting vulnerabilities in target assets.

It is another object of the invention to also provide a schedular-based design for the automatic vulnerability prediction platform.

It is yet another object of the invention to provide an API-based architecture for the automatic vulnerability prediction platform.

Still other objects and advantages of the invention will become apparent upon reading the detailed description in conjunction with the drawing figures.

SUMMARY OF THE INVENTION

The objects and advantages of the invention are secured by systems and methods for automatically predicting cybersecurity vulnerabilities in one or more target assets or simply targets. This is accomplished by loading and linking one or more ontologies in a graph database. At least one of the loaded/linked ontologies contains cybersecurity vulnerability information or simply vulnerabilities of various technologies and products. In the ontologies linked and loaded above, each technology/product, each of its associated vulnerabilities and each weakness that may lead to a vulnerability, are all identifiable by their identifiers.

In the preferred embodiment, the user enters targets in the instant vulnerability prediction system as a part of a bug-bounty program. An optional attack surface mapping or discovery module/service or discoverer automatically discovers additional targets related to or underlying the original asset entered by a user/customer or discovered thereafter if the customer input included a wildcard.

As a result of attack surface mapping, a list or collection of targets is made by the optional discovery service/module. In the absence of the discovery module/service, the list of targets is what was originally entered by the user. Regardless, a profiler is then executed for each target that collects the traits or technologies used by or operated with/by or implemented with/by the target. These traits are linked by the profiler to their respective targets by pointing or linking the targets to the technologies contained in the loaded ontologies with known vulnerabilities. The graph database is then queried to retrieve these vulnerabilities associated with the traits of the asset and consequently with the asset.

In a highly preferred embodiment, the ontologies loaded into the graph database comprise of common platform enumeration (CPE), common vulnerability and exposures (CVE) and common weakness enumeration (CWE) by MITRE and National Institute of Science and Technology (NIST). Preferably, the loaded ontologies also include a vulnerability rating taxonomy (VRT).

In one embodiment, the predicted vulnerabilities are based on the weaknesses as specified in CWE that are related to the traits/technologies profiled for the asset. However, in a preferred embodiment, the weaknesses are mapped to vulnerability classes and a severity/priority as specified in the VRT, which are then outputted by the system along with any other relevant ancillary information related to the vulnerabilities. In such a design, each technology in the graph database is identified by a CPE-ID.

In the same or another preferred embodiment, the discoverer utilizes Open Web Application Security Project (OWASP) Amass™ for attack surface mapping. In the same or another preferred embodiment, the discoverer utilizes Wappalyzer™. In the same or related embodiment, one or more Protocol and RDF Query Language (SPARQL) queries are executed against the graph database for predicting the vulnerabilities. Alternatively, the queries may be in any other suitable graph database query language, including GQL, Cypher, etc. Preferably, the graph database is AWS™ Neptune, Apache Fuseki™, Neo4j™, or any other suitable graph database.

The preferred implementation of the automatic vulnerability prediction platform utilizes a message-based service-oriented architecture (SOA) design. A change data capture (CDC) process continually monitors a backend database as new targets are entered into the system. In such an implementation, the various functionalities of the design are implemented as services that operate by publishing and subscribing to messages on a message bus. In such a real-time or near-real-time implementation, the system interactively provides feedback to the user about vulnerabilities predicted in the targets as they are entered into the system via an appropriate user interface.

In an alternate implementation however, a schedular-based design is used in which a batch process runs periodically to automatically identify new targets and to predict vulnerabilities in them. As an optimization, the results of graph queries are precomputed and loaded into a backend database. Those results can then later be retrieved at a later time and rendered as desired without loading the graph database unnecessarily. In yet another embodiment of the present technology, an API-based architecture is used in which various functions and modules of the system communicate via application programming interface (API) of function calls.

As one extension of the design, when the profiler encounters a technology/trait without a CPE-ID, a text-based search in the graph database is performed to see if there is an existing matching technology with a known CPE-ID. In such case of a match, the unknown technology is assigned the known CPE-ID of the matching technology, and subsequently the technology is linked to its respective target. However, if there is no match, then the technology is added to a list of unknown technologies. As more technologies with known CPE-IDs are entered into the graph, a batch job is periodically run that performs the above matching for unknown technologies.

As/when matches are found, the batch job assigns the unknown technologies with the known CPE-IDs and also links them to their respective targets. As another extension of the design, researchers/experts of a bug-bounty program are also identified that are suitable for working on the vulnerabilities of a target, based on the traits of the target and the researchers.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only.

It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
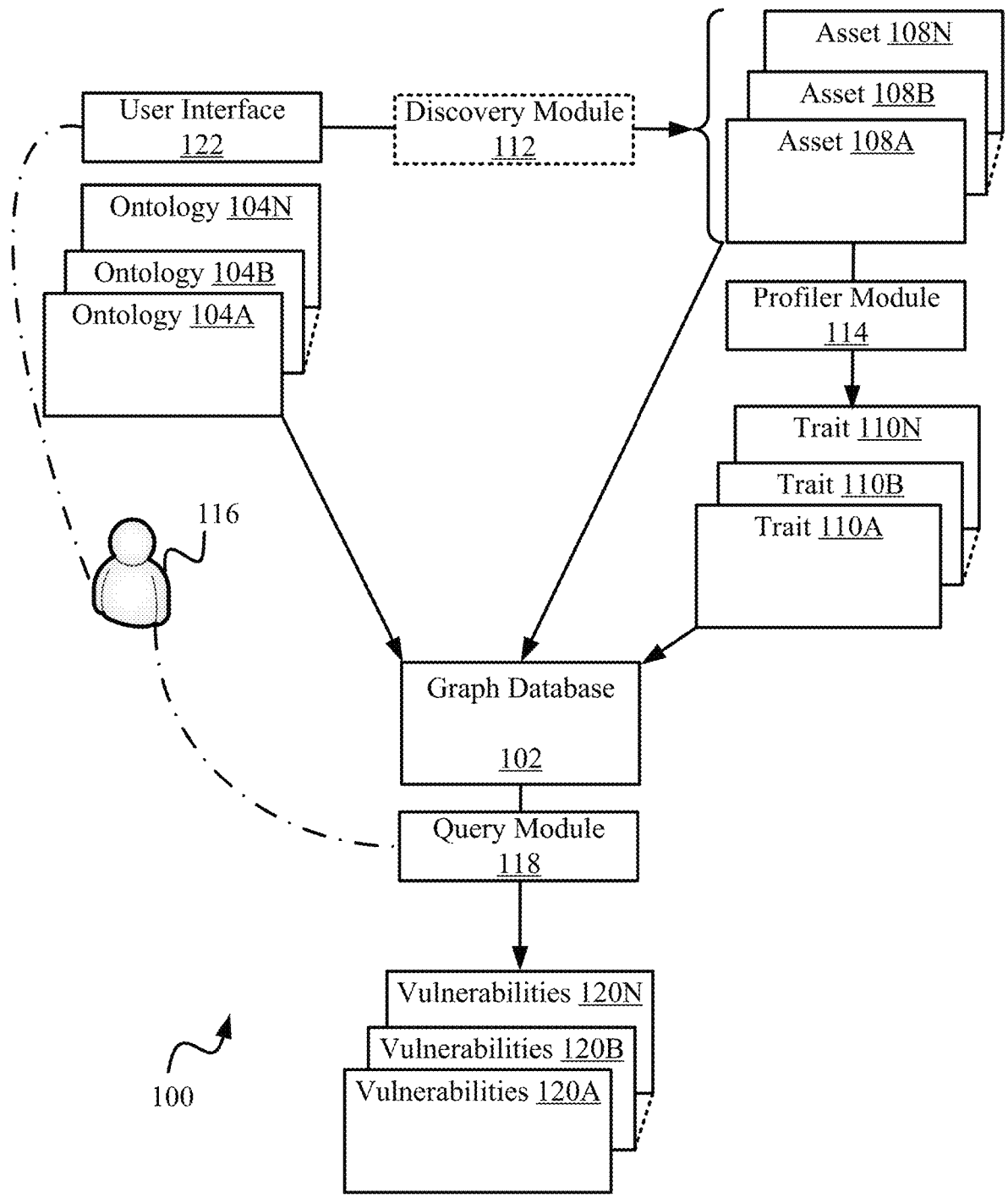
FIG. 1 is a high-level block diagram of a cybersecurity vulnerability/vulnerabilities prediction system according to the present invention.

The present invention will be best understood by first reviewing automatic cybersecurity or vulnerability/vulnerabilities prediction system 100 according to the current invention as illustrated in FIG. 1. Cybersecurity system 100 comprises a graph database 102 into which a number of ontologies 104A, 104B, . . . , 104N are stored or loaded. These ontologies 104 are interlinked or crosslinked or simply linked to each other as will be described herein. One or more of the loaded ontologies contains cybersecurity vulnerability information or simply vulnerability information or simply known vulnerabilities about various technologies and products. These known vulnerabilities are used by the present design for predicting cybersecurity vulnerabilities automatically in assets 108A, 108B, . . . , 108N.

One or more or any number of such ontologies 104A-N may be stored in database 102.

Cybersecurity system or vulnerabilities prediction system 100 of FIG. 1 is used to predict one or more cybersecurity vulnerabilities 120A, 120B, . . . , 120N in one or more target assets or systems or targets 108A-N. These assets 108 are typically information technology (IT) or computer systems, programming environments, websites, servers, mobile devices, hardware or software or firmware applications/systems or any other types of systems or endpoints accessible from system 100, and which may have vulnerabilities 120 that are desired to be predicted by system 100.

In a preferred embodiment, these one or more assets 108A-N are directly provided or entered into system 100 by user 116 via a user input on user interface 122 which may be a textual or a graphical user interface. However, in an alternate embodiment, one or more of assets 108A-N are automatically discovered by a discoverer or discovery module/function/capability/mechanism 112 based on the input provided by user 116. In such an embodiment, user 116 enters/provides a target asset or domain name, such as www.example.org, or a domain name with a wildcard, for example, *.example.org via user interface 122. Discovery module 112 then expands or resolves this user input and identifies the variety of related assets or websites associated with or within the infrastructure of or underlying the target asset entered by user 116. The user input provided by user 116 may alternatively be provided by means of a script, file, etc. also.

The above expansion of user input by optional discovery module or discoverer 112 may produce a list of assets 108 such as, news.example.org, finance.example.org, games.example.org, etc. Since automatic discovery or simply discovery module or discoverer 112 is not mandatory to the operation of the present technology, it is shown by a box with dotted outline. Targets 108, whether supplied by user 116 or discovered by optional discovery module 112, are observables according to the present disclosure. This is because these targets can be "observed" or accessed by vulnerabilities prediction system 100.

Thus, in the context of this disclosure, the term observable denotes an endpoint that can be observed or accessed from system 100. Such an observation or accessing may occur over a private network behind a firewall, or over a public network such as the internet. Any number of such assets or observables 108A-N may be entered by user 116 via user interface 122 and/or discovered by discovery module 112, and any number of vulnerabilities 120A-N may be predicted by automatic vulnerabilities prediction system 100.

Whether directly entered by user 116 or discovered by discoverer 112 based on a user input via user interface 122, assets 108 are then profiled using a profiler or profiling module 114. Profiling/profiler module/function/capability/mechanism 114 produces a list or collection of technologies or properties 110A, 110B, . . . , 110N used by assets 108A-N. These technologies or properties 110 are also referred to as traits in this disclosure.

The term trait refers to a property of a target such as a given technology used by the target. However, the term may also be used in the context of a researcher, such as a given technology that a researcher is skilled in testing. In such a context, the term identifies the skill of a researcher for testing a given technology. For example, a trait of a target may be Wordpress™ denoting a technology used by the target asset, while a trait of a researcher may also be Wordpress™ indicating that the researcher is skilled in testing Wordpress™. A trait is thus an identifier for a named entity denoting a technology/skill/property in order to facilitate matching and discovering relationships/connections between nodes based on the trait. In summary, a trait may either refer to a technology or a to a skill of a researcher for testing the same technology.

Therefore, the described vulnerabilities prediction system is not limited to predicting vulnerabilities automatically for targets that can be accessed over the internet. Targets as well as their profile information or traits/technologies can be acquired through other means, exemplarily via user input, import of profiling performed by a profiling system that may be offline, on-premise, etc. Such a scenario is especially relevant to automotive and other hardware targets that may not be connected to or accessible via the internet. Furthermore, one or both of discovery module 112 and profiler module 114, as well as any other module of system 100 may be installed locally or on-premise, without the requirement of internet-access.

Now, each of assets 108A-N is entered into graph database 102 as a node with its own unique target-ID. Furthermore, each trait 110A-N thus profiled is linked to its respective target as will be taught further below. None or zero or any number of the above traits 110A-N may be collected by profiler 114 for each of assets 108A-N. Based on the present design, graph database 102 thus contains one or more linked ontologies 104, one or more assets 108 and one or more traits 110 as exiting technologies/products with known vulnerabilities in ontologies 104.

A query module 118 or engine or function or mechanism or capability is then used to execute one or more queries on database 102. The queries retrieve the vulnerability information contained in the ontologies for technologies that are linked to the target as its traits. As shown by the dotted and dashed lines, the query module may be the same as or accessible from user interface 122 for executing the queries. In fact, user interface 122 may just be the interface that is used for executing graph queries against graph database 102 in system 100.

Based on results of the query or queries, vulnerability prediction system 100 predicts one or more cybersecurity vulnerabilities 120 in assets 108. The predicted cybersecurity vulnerabilities 120 are derived from or based on the vulnerability information contained in the one or more of the linked security ontologies loaded in graph database 102 per above. Of course, if there is only one ontology stored in the graph, it is not linked to any other ontology. However, for the purposes of this disclosure, we will still refer to it as a linked ontology for the sake of brevity. In such a scenario, the one loaded ontology must contain cybersecurity vulnerability information about technologies in order to derive the benefits of the present design. This is because the vulnerabilities predicted are derived from or based on this vulnerability information. In the preferred embodiment, vulnerabilities 120 refers to vulnerability classes that are predicted by system 100 in assets 108.

Figure 2:
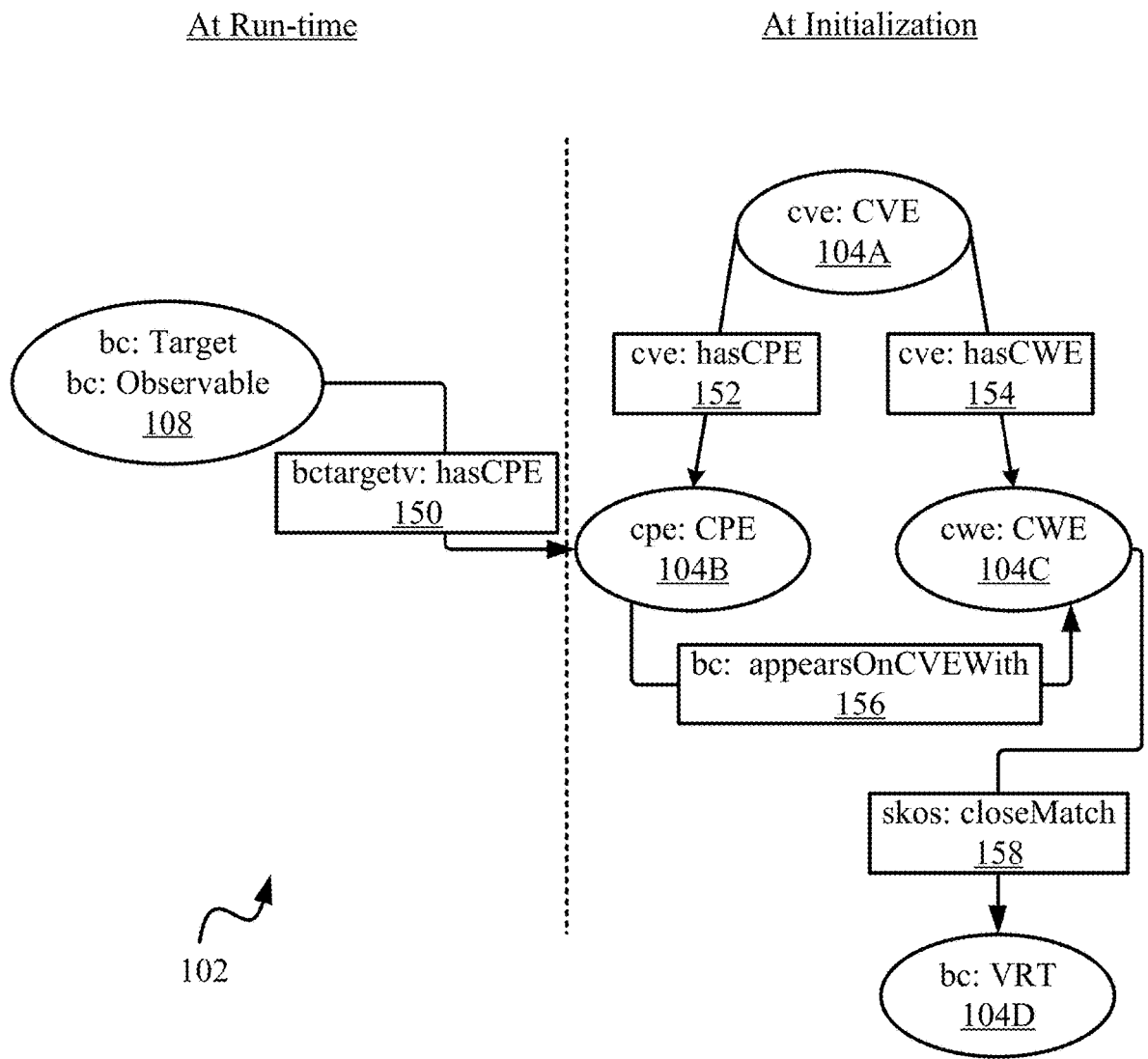
FIG. 2 is a conceptual diagram of graph database utilized by the instant vulnerability prediction system.

Let us now take a more detailed look at the workings of our cybersecurity prediction system 100 presented in FIG. 1. For this purpose, let us take advantage of FIG. 2 showing a conceptual visualization of our graph database 102 containing linked ontologies 104, assets or observables 108 along their traits. Ontologies 104 are loaded or ingested into graph database 102 using export/import or other known techniques based on file formats including XML, RDF, Turtle, etc. In the preferred embodiment of FIG. 2, one of ontologies 104 loaded in graph database 102 is Common Vulnerability and Exposures (CVE) 104A published and maintained by The MITRE Corporation or simply MITRE.

CVE 104A provides a method of referencing publicly known information security vulnerabilities and exposures by unique CVE Identifiers, or CVE Names, CVE Numbers or CVE-IDs. CVE-IDs are listed at MITRE as well as in the US National Vulnerability Database (NVD) operated by National Institute of Science and Technology (NIST). Alternatively, or in addition, any other ontology besides CVE for uniquely identifying vulnerabilities and exposures may be entered into graph database 102. Exemplarily, a known CVE in the product Wordpress™ version 5.5.2 is CVE-2020-28035 with the following description: "WordPress before 5.5.2 allows attackers to gain privileges via XML-RPC."

In the same or a related embodiment, another ontology amongst ontologies 104 stored in graph database 102 of FIG. 1 is Common Platform Enumeration (CPE) 104B also originally published and maintained by MITRE. CPE 104B is based on the generic syntax of Uniform Resource Identifiers (URI). It is a structured naming scheme for uniquely identifying IT technologies or products, systems, software, and packages.

CPE 104B includes a formal name format for the technologies, a method for checking names against a system and a description format for binding text and tests to a name. An agreed upon list of official CPE names or CPE-IDs is contained in XML format in the CPE Product Dictionary, and which is available to the general public. The CPE Dictionary is hosted and maintained at NIST. Each of our traits 110 of assets 108 of the above discussion is identified in ontology CPE 104B by a unique CPE Name or CPE-ID. For example, the CPE-id for Wordpress™ 5.5.2 mentioned above is specified as cpe:2.3:a:wordpress:wordpress:5.5.2:*:*:*:*:*:*:*. Alternatively, or in addition, any other ontology besides CPE 104B, for uniquely identifying technologies or products or IT systems, software, and packages may be entered into graph database 102.

In the same or a related embodiment, another ontology amongst ontologies 104 stored in graph database 102 of FIG. 1 is Common Weakness Enumeration (CWE) 104C also published and maintained by MITRE. CWE 104C is a system for enumerating and identifying software weaknesses. Its goal is to facilitate understanding of flaws and of creating automated tools that can be used to identify, fix, and prevent those flaws.

While a CVE in ontology CVE 104A refers to a specific instance of a vulnerability within a product or system, CWE 104C refers to software weaknesses, rather than specific instances of vulnerabilities within products or systems. Explained further, CWE weaknesses are errors that can lead to CVE vulnerabilities which are actually exploitable. A vulnerability is a mistake that can be directly used by a hacker to gain access to a system or network and a CWE can lead to such a vulnerability.

Each such CWE is identified by a CWE-ID and a descriptive CWE Name. For example, CVE-2020-28035 mentioned above lists CWE-269 with a CWE Name of "Improper Privilege Management" as one of the possible weaknesses that can lead to CVE-2020-28035. In one embodiment, it is these CWE 104C weaknesses that are predicted by vulnerability prediction system 100 of FIG. 1 as cybersecurity vulnerabilities 120. Alternatively, or in addition, any other ontology besides CWE 104C, for uniquely identifying weaknesses may be entered into graph database 102.

In the same or a related embodiment, yet another ontology stored in graph database 102 of FIG. 1 is Vulnerability Rating Taxonomy VRT (VRT) 104D. VRT assigns technical severity or a priority rating or simply priority or severity to each vulnerability class in VRT. In other words, it specifies classes of vulnerabilities as well as a severity level for each of the classes. It is a resource providing a baseline priority rating for commonly seen vulnerabilities while also including various edge cases. The baseline priority is based on generally accepted industry impact, average acceptance rate, average priority and commonly requested program-specific exclusions across many bug-bounty programs.

VRT is useful for bug hunters because it provides issues that are commonly seen and accepted by bug-bounty programs. It also helps researchers identify which types of high-value bugs they have overlooked, and when to provide exploitation information that may impact priority. For customers of bug-bounty programs it allows a better understanding of priorities and their impact, so they can create better program briefs, adjust bounty scope, and communicate more clearly about bugs.

In the preferred embodiment, the vulnerability classes and their associated priority levels as specified in VRT are output by vulnerability prediction system 100 of FIG. 1 as predicted vulnerabilities 120 in assets 108. However, as noted above, in alternate embodiment where ontology VRT 104D is not present, predicted vulnerabilities 120 may comprise the weaknesses (along with their names and other related information), such as those specified in ontology CWE 104C. Alternatively, the VRT vulnerability class and severity together with corresponding CWE weaknesses may also be outputted as predicted vulnerabilities 120.

To summarize, in the preferred embodiment, ontologies 104 reference or link to each other in the following way:

CVE 104A describes vulnerabilities in technologies. It links to the technologies by referencing one or more CPE-IDs pf CPE 104B affected by the vulnerabilities, and it further references the CWE-IDs of CWE 104C weaknesses that may lead to the vulnerabilities described by CVE.

VRT 104D links or maps CWE-IDs to its vulnerability classes and severity rating as will be taught further below.

Table 2 below presents VRT 104D from an exemplary implementation. Note the first column labeled Priority/Severity and the second column labeled Vulnerability Class of the present teachings. Columns 3 and 4 provide further ancillary information about the vulnerability, such as the name of the specific vulnerability detected, as well as the typically affected functions, etc. This ancillary information may also be outputted with predicted vulnerabilities 120 in various embodiments.

TABLE 2

| Priority/Severity | Vulnerability Class | Vulnerability Name | Variant or Affected Function |
|---|---|---|---|
| P1 | Server Security Misconfiguration | Using Default Credentials | |
| | Server-Side Injection | File Inclusion | Local |
| | Server-Side Injection | Remote Code Execution (RCE) | |
| | Server-Side Injection | SQL Injection | |
| | Server-Side Injection | XML External Entity Injection (XXE) | |
| | Broken Authentication and Session Management | Authentication Bypass | |
| | Sensitive Data Exposure | Disclosure of Secrets | For Publicly Accessible Asset |
| | Insecure OS/Firmware | Command Injection | |
| | Insecure OS/Firmware | Hardcoded Password | Privileged User |
| | Broken Cryptography | Cryptographic Flaw | Incorrect Usage |
| | Automotive Security Misconfiguration | Infotainment | PII Leakage |
| | Automotive Security Misconfiguration | RF Hub | Key Fob Cloning |
| P2 | Server Security Misconfiguration | Misconfigured DNS | Subdomain Takeover |
| | Server Security Misconfiguration | OAuth Misconfiguration | Account Takeover |
| | Sensitive Data Exposure | Weak Password Reset Implementation | Token Leakage via Host Header Poisoning |
| | Cross-Site Scripting (XSS) | Stored | Non-Privileged User to Anyone |
| | Broken Access Control (BAC) | Server-Side Request Forgery (SSRF) | Internal High Impact |
| | Cross-Site Request Forgery (CSRF) | Application-Wide | |
| | Application-Level Denial-of-Service (DoS) | Critical Impact and/or Easy Difficulty | |
| | Insecure OS/Firmware | Hardcoded Password | Non-Privileged User Code Execution (CAN Bus Pivot) |
| | Automotive Security Misconfiguration | Infotainment | |
| | Automotive Security Misconfiguration | RF Hub > CAN Injection | Interaction |
| P3 | Server Security Misconfiguration | Misconfigured DNS | Basic Subdomain Takeover |

TABLE 2-continued

| Priority/ Severity | Vulnerability Class | Vulnerability Name | Variant or Affected Function |
|---|---|---|---|
| | Server Security Misconfiguration | Mail Server Misconfiguration | No Spoofing Protection on Email Domain |
| | Server-Side Injection | HTTP Response Manipulation | Response Splitting (CRLF) |
| | Server-Side Injection | Content Spoofing | iframe Injection |
| | Broken Authentication and Session Management | Second Factor Authentication (2FA) Bypass | |
| | Broken Authentication and Session Management | Weak Login Function | HTTPS not Available or HTTP by Default |
| | Broken Authentication and Session Management | Session Fixation | Remote Attack Vector |
| | Sensitive Data Exposure | Disclosure of Secrets | For Internal Asset |
| | Sensitive Data Exposure | EXIF Geolocation Data Not Stripped From Uploaded Images | Automatic User Enumeration |
| | Cross-Site Scripting (XSS) | Stored | Privileged User to Privilege Elevation |
| | Cross-Site Scripting (XSS) | Stored | CSRF/URL-Based |
| | Cross-Site Scripting (XSS) | Reflected | Non-Self |
| | Broken Access Control (BAC) | Server-Side Request Forgery (SSRF) | Internal Scan and/or Medium Impact |
| | Application-Level Denial-of-Service (DoS) | High Impact and/or Medium Difficulty | |
| | Client-Side Injection | Binary Planting | Default Folder Privilege Escalation |
| | Automotive Security Misconfiguration | Infotainment | Code Execution (No CAN Bus Pivot) |
| | Automotive Security Misconfiguration | Infotainment | Unauthorized Access to Services (API/ Endpoints) |
| | Automotive Security Misconfiguration | RF Hub | Data Leakage/Pull Encryption Mechanism |
| P4 | Server Security Misconfiguration | Misconfigured DNS | Zone Transfer |
| | Server Security Misconfiguration | Mail Server Misconfiguration | Email Spoof to Inbox due to miss/misconfig DMARC on Email |
| | Server Security Misconfiguration | Database Management System (DBMS) Misconfiguration | Excessively Privileged User/DBA |
| | Server Security Misconfiguration | Lack of Password Confirmation | Delete Account |
| | Server Security Misconfiguration | No Rate Limiting on Form | Registration |
| | Server Security Misconfiguration | No Rate Limiting on Form | Login |
| | Server Security Misconfiguration | No Rate Limiting on Form | Email-Triggering |
| | Server Security Misconfiguration | No Rate Limiting on Form | SMS-Triggering |
| | Server Security Misconfiguration | Missing Secure or HTTPOnly Cookie Flag | Session Token |
| | Server Security Misconfiguration | Clickjacking | Sensitive Click-Based Action |
| | Server Security Misconfiguration | CAPTCHA Implementation Vulnerability | |
| | Server Security Misconfiguration | Lack of Security Headers | Cache-Control for a Sensitive Page |
| | Server Security Misconfiguration | Web Application Firewall (WAF) Bypass | Direct Server Access |
| | Server-Side Injection | Content Spoofing | Impersonation via Broken Link Hijacking |
| | Server-Side Injection | Content Spoofing | External Authentication Injection |
| | Server-Side Injection | Content Spoofing | Email HTML Injection |
| | Server-Side Injection | Server-Side Template Injection (SSTI) | Basic |
| | Broken Authentication and Session Management | Cleartext Transmission of Session Token | |
| | Broken Authentication and Session Management | Weak Login Function | Other Plaintext Protocol with no Secure Alternative |
| | Broken Authentication and Session Management | Weak Login Function | LAN Only |
| | Broken Authentication and Session Management | Weak Login Function | HTTP and HTTPS Available |
| | Broken Authentication and Session Management | Failure to Invalidate Session | On Logout (Client and Server-Side) |
| | Broken Authentication and Session Management | Failure to Invalidate Session | On Password Reset and/or Change |
| | Broken Authentication and Session Management | Weak Registration Implementation | Over HTTP |
| | Sensitive Data Exposure | Disclosure of Secrets | Pay-Per-Use Abuse |
| | Sensitive Data Exposure | EXIF Geolocation Data Not Stripped From Uploaded Images | Manual User Enumeration |
| | Sensitive Data Exposure | Visible Detailed Error/Debug Page | Detailed Server Configuration |
| | Sensitive Data Exposure | Token Leakage via Referer | Untrusted 3rd Party |
| | Sensitive Data Exposure | Token Leakage via Referer | Over HTTP |
| | Sensitive Data Exposure | Sensitive Token in URL | User Facing |
| | Sensitive Data Exposure | Weak Password Reset Implementation | Password Reset Token Sent Over HTTP |
| | Sensitive Data Exposure | Via localstorage/ sessionstorage | Sensitive Token |
| | Cross-Site Scripting (XSS) | Stored | Privileged User to No Privilege Elevation |

TABLE 2-continued

| Priority/Severity | Vulnerability Class | Vulnerability Name | Variant or Affected Function |
|---|---|---|---|
| | Cross-Site Scripting (XSS) | Flash-Based | |
| | Cross-Site Scripting (XSS) | IE-Only | IE11 |
| | Cross-Site Scripting (XSS) | Referer | |
| | Cross-Site Scripting (XSS) | Universal (UXSS) | |
| | Cross-Site Scripting (XSS) | Off-Domain | Data URI |
| | Broken Access Control (BAC) | Server-Side Request Forgery (SSRF) | External |
| | Broken Access Control (BAC) | Username/Email Enumeration | Non-Brute Force |
| | Cross-Site Request Forgery (CSRF) | Flash-Based | High Impact |
| | Unvalidated Redirects and Forwards | Open Redirect | GET-Based |
| | Insufficient Security Configurability | No Password Policy | |
| | Insufficient Security Configurability | Weak Password Reset Implementation | Token is Not Invalidated After Use |
| | Insufficient Security Configurability | Weak 2FA Implementation | 2FA Secret Cannot be Rotated |
| | Insufficient Security Configurability | Weak 2FA Implementation | 2FA Secret Remains Obtainable After 2FA is Enabled |
| | Using Components with Known Vulnerabilities | Rosetta Flash | |
| | Insecure Data Storage | Sensitive Application Data Stored Unencrypted | On External Storage |
| | Insecure Data Storage | Server-Side Credentials Storage | Plaintext |
| | Insecure Data Transport | Executable Download | No Secure Integrity Check |
| | Privacy Concerns | Unnecessary Data Collection | WiFi SSID + Password |
| | Automotive Security Misconfiguration | Infotainment | Source Code Dump |
| | Automotive Security Misconfiguration | Infotainment | Denial of Service (DoS/Brick) |
| | Automotive Security Misconfiguration | Infotainment | Default Credentials |
| | Automotive Security Misconfiguration | RF Hub | Unauthorized Access/Turn On |
| | Automotive Security Misconfiguration | CAN | Injection (Disallowed Messages) |
| | Automotive Security Misconfiguration | CAN | Injection (DoS) |
| P5 | Server Security Misconfiguration | Directory Listing Enabled | Non-Sensitive Data Exposure |
| | Server Security Misconfiguration | Same-Site Scripting | |
| | Server Security Misconfiguration | Misconfigured DNS | Missing Certification Authority Authorization (CAA) Record |
| | Server Security Misconfiguration | Mail Server Misconfiguration | Email Spoofing to Spam Folder |
| | Server Security Misconfiguration | Mail Server Misconfiguration | Missing or Misconfigured SPF and/or DKIM |
| | Server Security Misconfiguration | Mail Server Misconfiguration | Email Spoofing on Non-Email Domain |
| | Server Security Misconfiguration | Lack of Password Confirmation | Change Email Address |
| | Server Security Misconfiguration | Lack of Password Confirmation | Change Password |
| | Server Security Misconfiguration | Lack of Password Confirmation | Manage 2FA |
| | Server Security Misconfiguration | No Rate Limiting on Form | Change Password |
| | Server Security Misconfiguration | Unsafe File Upload | No Antivirus |
| | Server Security Misconfiguration | Unsafe File Upload | No Size Limit |
| | Server Security Misconfiguration | Unsafe File Upload | File Extension Filter Bypass |
| | Server Security Misconfiguration | Cookie Scoped to Parent Domain | |
| | Server Security Misconfiguration | Missing Secure or HTTPOnly Cookie Flag | Non-Session Cookie |
| | Server Security Misconfiguration | Clickjacking | Form Input |
| | Server Security Misconfiguration | Clickjacking | Non-Sensitive Action |
| | Server Security Misconfiguration | CAPTCHA | Brute Force |
| | Server Security Misconfiguration | CAPTCHA | Missing |
| | Server Security Misconfiguration | Exposed Admin Portal | To Internet |
| | Server Security Misconfiguration | Missing DNSSEC | |
| | Server Security Misconfiguration | Fingerprinting/Banner Disclosure | |
| | Server Security Misconfiguration | Username/Email Enumeration | Brute Force |
| | Server Security Misconfiguration | Potentially Unsafe HTTP Method Enabled | OPTIONS |
| | Server Security Misconfiguration | Potentially Unsafe HTTP Method Enabled | TRACE |
| | Server Security Misconfiguration | Insecure SSL | Lack of Forward Secrecy |
| | Server Security Misconfiguration | Insecure SSL | Insecure Cipher Suite |
| | Server Security Misconfiguration | Insecure SSL | Certificate Error |
| | Server Security Misconfiguration | Reflected File Download (RFD) | |
| | Server Security Misconfiguration | Lack of Security Headers | X-Frame-Options |
| | Server Security Misconfiguration | Lack of Security Headers | Cache-Control for a Non-Sensitive Page |

TABLE 2-continued

| Priority/Severity | Vulnerability Class | Vulnerability Name | Variant or Affected Function |
|---|---|---|---|
| | Server Security Misconfiguration | Lack of Security Headers | X-XSS-Protection |
| | Server Security Misconfiguration | Lack of Security Headers | Strict-Transport-Security |
| | Server Security Misconfiguration | Lack of Security Headers | X-Content-Type-Options |
| | Server Security Misconfiguration | Lack of Security Headers | Content-Security-Policy |
| | Server Security Misconfiguration | Lack of Security Headers | Public-Key-Pins |
| | Server Security Misconfiguration | Lack of Security Headers | X-Content-Security-Policy |
| | Server Security Misconfiguration | Lack of Security Headers | X-Webkit-CSP |
| | Server Security Misconfiguration | Lack of Security Headers | Content-Security-Policy-Report-Only |
| | Server Security Misconfiguration | Bitsquatting | |
| | Server-Side Injection | Parameter Pollution | Social Media Sharing Buttons |
| | Server-Side Injection | Content Spoofing | Flash Based External Authentication Injection |
| | Server-Side Injection | Content Spoofing | Email Hyperlink Injection Based on Email Provider |
| | Server-Side Injection | Content Spoofing | Text Injection |
| | Server-Side Injection | Content Spoofing | Homograph/IDN-Based |
| | Server-Side Injection | Content Spoofing | Right-to-Left Override (RTLO) |
| | Broken Authentication and Session Management | Weak Login Function | Not Operational or Intended Public Access |
| | Broken Authentication and Session Management | Session Fixation | Local Attack Vector |
| | Broken Authentication and Session Management | Failure to Invalidate Session | On Logout (Server-Side Only) |
| | Broken Authentication and Session Management | Failure to Invalidate Session | Concurrent Sessions On Logout |
| | Broken Authentication and Session Management | Failure to Invalidate Session | On Email Change |
| | Broken Authentication and Session Management | Failure to Invalidate Session | On 2FA Activation/Change |
| | Broken Authentication and Session Management | Failure to Invalidate Session | Long Timeout |
| | Broken Authentication and Session Management | Concurrent Logins | |
| | Sensitive Data Exposure | Disclosure of Secrets | Intentionally Public, Sample or Invalid |
| | Sensitive Data Exposure | Disclosure of Secrets | Data/Traffic Spam |
| | Sensitive Data Exposure | Disclosure of Secrets | Non-corporate User |
| | Sensitive Data Exposure | Visible Detailed Error/Debug Page | Full Path Disclosure |
| | Sensitive Data Exposure | Visible Detailed Error/Debug Page | Descriptive Stack Trace |
| | Sensitive Data Exposure | Disclosure of Known Public Information | |
| | Sensitive Data Exposure | Token Leakage via Referer | Trusted 3rd Party |
| | Sensitive Data Exposure | Sensitive Token in URL | In the Background |
| | Sensitive Data Exposure | Sensitive Token in URL | On Password Reset |
| | Sensitive Data Exposure | Non-Sensitive Token in URL | |
| | Sensitive Data Exposure | Mixed Content (HTTPS Sourcing HTTP) | |
| | Sensitive Data Exposure | Sensitive Data Hardcoded | OAuth Secret |
| | Sensitive Data Exposure | Sensitive Data Hardcoded | File Paths |
| | Sensitive Data Exposure | Internal IP Disclosure | |
| | Sensitive Data Exposure | JSON Hijacking | |
| | Sensitive Data Exposure | Via localstorage/sessionstorage Stored | Non-Sensitive Token |
| | Cross-Site Scripting (XSS) | Reflected | Self |
| | Cross-Site Scripting (XSS) | Cookie-Based | |
| | Cross-Site Scripting (XSS) | IE-Only | XSS Filter Disabled |
| | Cross-Site Scripting (XSS) | IE-Only | Older Version (<IE11) |
| | Cross-Site Scripting (XSS) | TRACE Method | |
| | Broken Access Control (BAC) | Server-Side Request Forgery (SSRF) | DNS Query Only |
| | Cross-Site Request Forgery (CSRF) | Action-Specific | Logout |
| | Cross-Site Request Forgery (CSRF) | CSRF Token Not Unique Per Request | |
| | Cross-Site Request Forgery (CSRF) | Flash-Based | Low Impact |
| | Application-Level Denial-of-Service (DoS) | App Crash | Malformed Android Intents |
| | Application-Level Denial-of-Service (DoS) | App Crash | Malformed iOS URL Schemes |
| | Unvalidated Redirects and Forwards | Open Redirect | POST-Based |
| | Unvalidated Redirects and Forwards | Open Redirect | Header-Based |
| | Unvalidated Redirects and Forwards | Open Redirect | Flash-Based |
| | Unvalidated Redirects and Forwards | Tabnabbing | |

TABLE 2-continued

| Priority/Severity | Vulnerability Class | Vulnerability Name | Variant or Affected Function |
|---|---|---|---|
| | Unvalidated Redirects and Forwards | Lack of Security Speed Bump Page | |
| | External Behavior | Browser Feature | Plaintext Password Field |
| | External Behavior | Browser Feature | Save Password |
| | External Behavior | Browser Feature | Autocomplete Enabled |
| | External Behavior | Browser Feature | Autocorrect Enabled |
| | External Behavior | Browser Feature | Aggressive Offline Caching |
| | External Behavior | CSV Injection | |
| | External Behavior | Captcha Bypass | Crowdsourcing |
| | External Behavior | System Clipboard Leak | Shared Links |
| | External Behavior | User Password Persisted in Memory | |
| | Insufficient Security Configurability | Weak Password Policy | |
| | Insufficient Security Configurability | Weak Password Reset Implementation | Token is Not Invalidated After Email Change |
| | Insufficient Security Configurability | Weak Password Reset Implementation | Token is Not Invalidated After Password Change |
| | Insufficient Security Configurability | Weak Password Reset Implementation | Token Has Long Timed Expiry |
| | Insufficient Security Configurability | Weak Password Reset Implementation | Token is Not Invalidated After New Token is Requested |
| | Insufficient Security Configurability | Weak Password Reset Implementation | Token is Not Invalidated After Login |
| | Insufficient Security Configurability | Lack of Verification Email | |
| | Insufficient Security Configurability | Lack of Notification Email | |
| | Insufficient Security Configurability | Weak Registration Implementation | Allows Disposable Email Addresses |
| | Insufficient Security Configurability | Weak 2FA Implementation | Missing Failsafe |
| | Using Components with Known Vulnerabilities | Outdated Software Version | |
| | Using Components with Known Vulnerabilities | Captcha Bypass | OCR (Optical Character Recognition) |
| | Insecure Data Storage | Sensitive Application Data Stored Unencrypted | On Internal Storage |
| | Insecure Data Storage | Non-Sensitive Application Data Stored Unencrypted | |
| | Insecure Data Storage | Screen Caching Enabled | |
| | Lack of Binary Hardening | Lack of Exploit Mitigations | |
| | Lack of Binary Hardening | Lack of Jailbreak Detection | |
| | Lack of Binary Hardening | Lack of Obfuscation | |
| | Lack of Binary Hardening | Runtime Instrumentation-Based Executable Download | |
| | Insecure Data Transport | | Secure Integrity Check |
| | Network Security Misconfiguration | Telnet Enabled | |
| | Mobile Security Misconfiguration | SSL Certificate Pinning | Absent |
| | Mobile Security Misconfiguration | SSL Certificate Pinning | Defeatable |
| | Mobile Security Misconfiguration | Tapjacking | |
| | Mobile Security Misconfiguration | Clipboard Enabled | |
| | Mobile Security Misconfiguration | Auto Backup Allowed by Default | |
| | Client-Side Injection | Binary Planting | Non-Default Folder Privilege Escalation |
| | Client-Side Injection | Binary Planting | No Privilege Escalation |
| | Automotive Security Misconfiguration | RF Hub | Roll Jam |
| | Automotive Security Misconfiguration | RF Hub | Replay |
| | Automotive Security Misconfiguration | RF Hub | Relay |
| Varies | Server Security Misconfiguration | | |
| | Server Security Misconfiguration | Unsafe Cross-Origin Resource Sharing | |
| | Server Security Misconfiguration | Path Traversal | |
| | Server Security Misconfiguration | Directory Listing Enabled | |
| | Server Security Misconfiguration | Directory Listing Enabled | Sensitive Data Exposure |
| | Server Security Misconfiguration | SSL Attack (BREACH, POODLE etc.) | |
| | Server Security Misconfiguration | Misconfigured DNS | |
| | Server Security Misconfiguration | Mail Server Misconfiguration | |
| | Server Security Misconfiguration | Database Management System (DBMS) Misconfiguration | |
| | Server Security Misconfiguration | Lack of Password Confirmation | |
| | Server Security Misconfiguration | No Rate Limiting on Form | |
| | Server Security Misconfiguration | Unsafe File Upload | |
| | Server Security Misconfiguration | Missing Secure or HTTPOnly Cookie Flag | |
| | Server Security Misconfiguration | Clickjacking | |
| | Server Security Misconfiguration | OAuth Misconfiguration | |
| | Server Security | OAuth | Missing/ |

TABLE 2-continued

| Priority/Severity | Vulnerability Class | Vulnerability Name | Variant or Affected Function |
|---|---|---|---|
| | Misconfiguration | Misconfiguration | Broken State Parameter |
| | Server Security Misconfiguration | OAuth Misconfiguration | Insecure Redirect URI |
| | Server Security Misconfiguration | CAPTCHA | |
| | Server Security Misconfiguration | Exposed Admin Portal | |
| | Server Security Misconfiguration | Username/Email Enumeration | |
| | Server Security Misconfiguration | Potentially Unsafe HTTP Method Enabled | |
| | Server Security Misconfiguration | Insecure SSL | |
| | Server Security Misconfiguration | Lack of Security Headers | |
| | Server Security Misconfiguration | Web Application Firewall (WAF) Bypass | |
| | Server Security Misconfiguration | Race Condition | |
| | Server Security Misconfiguration | Cache Poisoning | |
| | Server-Side Injection | | |
| | Server-Side Injection | File Inclusion | |
| | Server-Side Injection | Parameter Pollution | |
| | Server-Side Injection | HTTP Response Manipulation | |
| | Server-Side Injection | Content Spoofing | |
| | Server-Side Injection | Server-Side Template Injection (SSTI) | |
| | Server-Side Injection | Server-Side Template Injection (SSTI) | Custom |
| | Broken Authentication and Session Management | | |
| | Broken Authentication and Session Management | Privilege Escalation | |
| | Broken Authentication and Session Management | Weak Login Function | |
| | Broken Authentication and Session Management | Session Fixation | |
| | Broken Authentication and Session Management | Failure to Invalidate Session | |
| | Broken Authentication and Session Management | Weak Registration Implementation | |
| | Sensitive Data Exposure | | |
| | Sensitive Data Exposure | Disclosure of Secrets | |
| | Sensitive Data Exposure | EXIF Geolocation Data Not Stripped From Uploaded Images | |
| | Sensitive Data Exposure | Visible Detailed Error/Debug Page | |
| | Sensitive Data Exposure | Token Leakage via Referer | |
| | Sensitive Data Exposure | Sensitive Token in URL | |
| | Sensitive Data Exposure | Weak Password Reset Implementation | |
| | Sensitive Data Exposure | Sensitive Data | |
| | Sensitive Data Exposure | Hardcoded | |
| | Sensitive Data Exposure | Cross Site Script Inclusion (XSSI) | |
| | Sensitive Data Exposure | Via localstorage/sessionstorage | |
| | Cross-Site Scripting (XSS) | Stored | |
| | Cross-Site Scripting (XSS) | Reflected | |
| | Cross-Site Scripting (XSS) | IE-Only | |
| | Cross-Site Scripting (XSS) | Off-Domain | |
| | Cross-Site Scripting (XSS) | | |
| | Broken Access Control (BAC) | | |
| | Broken Access Control (BAC) | Insecure Direct Object References (IDOR) | |
| | Broken Access Control (BAC) | Server-Side Request Forgery (SSRF) | |
| | Broken Access Control (BAC) | Username/Email Enumeration | |
| | Broken Access Control (BAC) | Exposed Sensitive Android Intent | |
| | Broken Access Control (BAC) | Exposed Sensitive iOS URL Scheme | |
| | Cross-Site Request Forgery (CSRF) | | |
| | Cross-Site Request Forgery (CSRF) | Action-Specific | |
| | Cross-Site Request Forgery (CSRF) | Action-Specific | Authenticated Action |
| | Cross-Site Request Forgery (CSRF) | Action-Specific | Unauthenticated Action |
| | Cross-Site Request Forgery (CSRF) | Flash-Based | |
| | Application-Level Denial-of-Service (DoS) | | |
| | Application-Level Denial-of-Service (DoS) | App Crash | |
| | Unvalidated Redirects and Forwards | | |
| | Unvalidated Redirects and Forwards | Open Redirect | |
| | External Behavior | | |
| | External Behavior | Browser Feature | |
| | External Behavior | Captcha Bypass | |
| | External Behavior | System Clipboard Leak | |
| | Insufficient Security Configurability | | |
| | Insufficient Security Configurability | Weak Password Reset Implementation | |
| | Insufficient Security Configurability | Weak Registration Implementation | |
| | Insufficient Security Configurability | Weak 2FA Implementation | |
| | Insufficient Security Configurability | Using | |

TABLE 2-continued

| Priority/ Severity | Vulnerability Class | Vulnerability Name | Variant or Affected Function |
|---|---|---|---|
| | Components with Known Vulnerabilities | | |
| | Using Components with Known Vulnerabilities | Captcha Bypass | |
| | Insecure Data Storage | | |
| | Insecure Data Storage | Sensitive Application Data Stored Unencrypted | |
| | Insecure Data Storage | Server-Side Credentials Storage | |
| | Lack of Binary Hardening | | |
| | Insecure Data Transport | | |
| | Insecure Data Transport | Cleartext Transmission of Sensitive Data | |
| | Insecure Data Transport | Executable Download | |
| | Insecure OS/Firmware | | |
| | Insecure OS/Firmware | Hardcoded Password | |
| | Broken Cryptography | | |
| | Broken Cryptography | Cryptographic Flaw | |
| | Privacy Concerns | | |
| | Privacy Concerns | Unnecessary Data Collection | |
| | Network Security Misconfiguration | | |
| | Mobile Security Misconfiguration | | |
| | Mobile Security Misconfiguration | SSL Certificate Pinning | |
| | Client-Side Injection | | |
| | Client-Side Injection | Binary Planting | |
| | Automotive Security Misconfiguration | | |
| | Automotive Security Misconfiguration | Infotainment | |
| | Automotive Security Misconfiguration | RF Hub | |
| | Automotive Security Misconfiguration | CAN | |
| | Indicators of Compromise | | |

Referring now to FIG. 2, all the nodes and edges in the graph database 102 have an exemplary prefix or namespace in their properties specified as key-value pairs. Specifically, per node 104A, ontology CVE 104A is specified in namespace cve and per node 104B, ontology CPE 104B is in namespace cpe. Similarly, per nodes 104C and 104D respectively, ontologies CWE 104C and VRT 104D are in namespaces/prefixes cwe and be respectively.

Nodes of ontology CVE 104A are linked or related to nodes of ontology CPE 104B and to nodes of ontology CWE 104C via edges/predicates 152 and 154 respectively as shown. Similarly, nodes of ontology CPE 104B are linked to nodes of ontology CWE 104C via edges/predicates 156, and nodes of ontology CWE 104C are linked to nodes of ontology VRT 104D via edges/predicates 158 as shown. These links or relationships is what links or crosslinks these ontologies in graph database 102 according to the present design. These will be discussed further below also.

It should be noted that FIG. 2 represents a conceptual view of the graph database 102 of the above teachings to facilitate understanding. In actuality, there will be many more nodes belonging to each of ontologies 104 and many more edges connecting the nodes than the ones shown in FIG. 2. Thus, ontology CVE 104A loaded in graph database 102 will actually consist of many CVE nodes, each containing or corresponding to a vulnerability/exposure with a unique CVE-ID.

In a similar manner, ontologies CPE 104B, CWE 104C and VRT 104D will also consist of a number of nodes each. Thus, each CPE node of ontology 104B will contain or correspond to a unique CPE-ID, and each CWE node of ontology CWE 104C will contain or correspond to a unique CWE-ID. Further, each VRT node of ontology VRT 104D will also contain or correspond to a unique VRT-ID or VRTid. In other words, each of the nodes of the ontologies have a unique identifier or ID.

In the preferred embodiment, an initial load/storage of ontologies 104 into graph database 102 is carried out at initialization. This is accomplished via a file or bulk uploaded of these ontologies by utilizing a suitable file format, such XML, RDF, Turtle, etc. per above. Thereafter, these ontologies are refreshed on a periodic basis, for example, monthly.

In the same or related embodiment, ontologies 104 are represented as Resource Description Framework (RDF) triples: subject, predicate, object. In an exemplary implementation of graph database 102, as each triple is loaded into the graph, the graph database creates two nodes, subject and object—if they do not already exist as identified by their unique IDs per above, otherwise the graph database updates any already existing nodes. Furthermore, an edge between the nodes is created based on the predicate if one does not already exist. The predicates of the loaded triples define the links/relationships/edges between the nodes.

FIG. 2 shows targets 108 connected to nodes of ontology CPE 104B by links/edges defined by predicate bctargetv: hasCPE shown in box 150. What this means is that targets/observables 108 use or implement specific traits/technologies/properties corresponding to CPE nodes as defined by the bctargetv:hasCPE predicate. Predicate cve:hasCPE indicated by box 152 defines the links/edges connecting CVE nodes to CPE nodes. What this means is that these CVE nodes identify specific cybersecurity vulnerabilities to exist in specific technologies/traits/products as identified by specific CPE nodes as defined by the cve:hasCPE predicate.

Similarly, predicate cve:hasCWE shown in box 154 defines links/edges/relationships connecting CVE nodes to CWE nodes. What this means is that these CVE nodes corresponding to specific cybersecurity vulnerabilities have weaknesses corresponding to specific CWE nodes as defined by the cve:hasCWE predicate. Predicate bc:appearsOnCVEWith in box 156 defines links/edges/relationships connecting CPE nodes to CWE nodes. What this means is that these CPE nodes corresponding to specific technologies/traits of target(s) 108 have weaknesses corresponding to specific CWE nodes as defined by the bc: appearsOnCVEWith predicate.

Finally, predicate skos:closeMatch in box 158 defines links/edges/relationships connecting or mapping CWE nodes to VRT nodes. What this means is that these CWE nodes corresponding to specific weaknesses closely match the VRT nodes with their specific vulnerability classes and severity rating, as defined by the skos:closeMatch predicate. These matching VRT vulnerability classes and associated severity rating are then outputted by vulnerability prediction system 100 of FIG. 1 as predicted vulnerabilities 120 in target(s) 108. Alternatively, when ontology VRT 104D is not present in graph database 102, system 100 may just output weaknesses corresponding to CWE nodes as pointed to by the cve:hasCWE link/predicate above, as vulnerabilities 120 in target(s) 108.

The present design takes advantage of the closeMatch mapping property of the Simple Knowledge Organization System (skos) namespace known in the art. This property is useful in finding matches between CWE and VRT ontologies or in other words mapping CWE weaknesses to VRT vulnerability classes. In other words, the closeMatch mapping property of skos namespace in the above design allows one to find matching nodes in ontology VRT 104D to a given CWE node in ontology CWE 104.

Explained further, for a given CWE node with a CWE-ID, the skos:closeMatch predicate will point to those VRT nodes whose properties are close enough match to the properties of the CWE node. This allows one to perform a "fuzzy" matching of CWE nodes to VRT nodes. In a highly preferred embodiment, the above mapping utilizes a schema and mapping as specified in cwe_schema_json.txt and cwe_json.txt files submitted with the computer program listings appendix. This predicate/link skos:closeMatch or mapping is preferably established along with predicate/link bc:appearsOnCVEWith to be discussed further below along with the other predicates interlinking ontologies 104, when they are first loaded/ingested into graph database 102 during initialization.

Consequently, based on the graph of FIG. 2 containing our linked ontologies 104, given a target node 108, the hasCPE link points to the linked/associated CPE node(s) 104B, the appearsOnCVEWith link points to the linked/associated CWE node(s) 104C, and finally the skos:closeMatch link points to the linked/associated VRT node(s) 104D. Because of the appearsOnCVEWith link to be discussed further below, CVE node(s) 104A need not be traversed to arrive at the eventual VRT node(s) 104D.

In the preferred embodiment, these VRT node(s) of ontology VRT 104D are then used by instant vulnerability prediction system 100 of FIG. 1 to output severity levels alongside vulnerability classes as a part of predicted vulnerabilities 120. Alternatively, or in addition, predicted vulnerabilities 120 may further comprise weaknesses corresponding to CWE nodes as per cve:hasCWE predicate above, alongside any other related useful information or properties of those weaknesses. This is one of the contributions of the present design that it links the above ontologies in a systematic manner in order to predict potential cybersecurity vulnerabilities and their potential severity in the targets.

As indicated in FIG. 2 by the dotted line, in the preferred embodiment, ontologies 104 along with their nodes and edges or links per above explanation, are loaded in graph database 102 during initialization and through preferably a bulk-load mechanism. However, targets 108 and their relationships to ontologies 104, and specifically to CPE-IDs (or CPE nodes), are loaded at run-time during the operation of the automatic vulnerabilities prediction system. This run-time loading is preferably performed by a loader/loading/ingester/ingesting module/service/server as will be discussed further below.

It is during the operation of the system, that is, at run-time that any desired target may be inputted into the system for vulnerability analysis after the initial loading of the linked ontologies has been done. In other words, any desired target 108 may be entered by user 116 of FIG. 1 via user interface 122 for analysis during run-time as needed. Preferably, the vulnerability analysis of target(s) 108 is performed as a part of a bug-bounty program.

Figure 3:
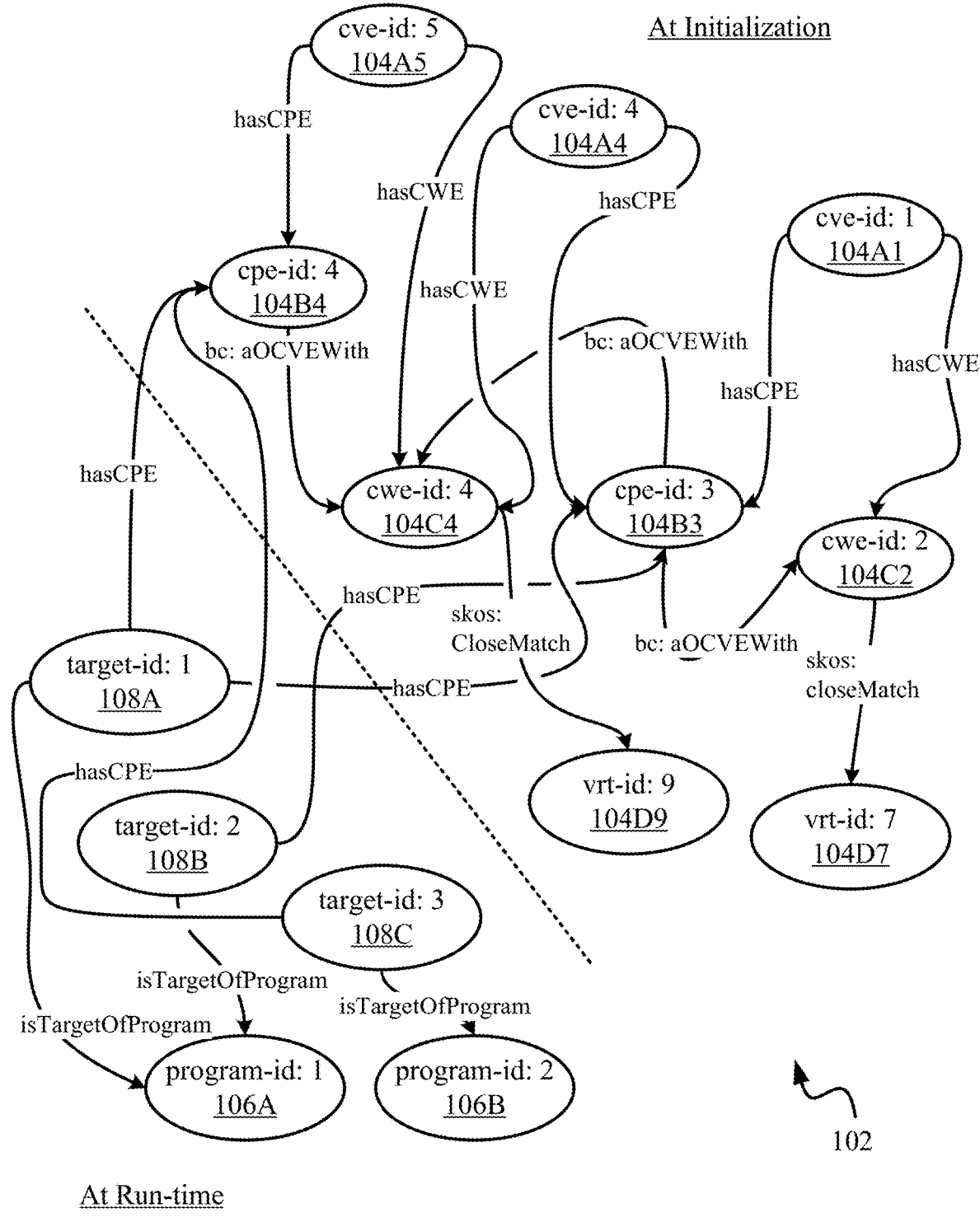
FIG. 3 illustrates an exemplary instance of the graph database depicted at the conceptual level in FIG. 2.

FIG. 3 shows an exemplary instance of the conceptual graph of FIG. 2 loaded in our graph database 102. Specifically, FIG. 3 shows CVE nodes 104A1, 104A4 and 104A5 representing unique CVE-IDs 1, 4 and 5 of ontology CVE 104A respectively. These CVE-IDs are exemplary and chosen to have a simple form in order to facilitate explanation. Similarly, CPE nodes 104B3 and 104B4 represent unique CPE-IDs 3 and 4 of ontology CPE 104B respectively. CWE nodes 104C2 and 104C4 represent CWE-IDs 2 and 4 of ontology CWE 104C respectively, and VRT nodes 104D7 and 104D9 represent unique VRT-IDs 7 and 9 of ontology VRT 104D respectively. As shown by the dotted line, these ontologies 104 are loaded into graph 102 during initialization per above discussion.

Also shown in FIG. 3 are relationships or edges between the above nodes along with their respective predicates/properties defining them and as per above discussion. More specifically, the predicate/property hasCPE is responsible for edges from nodes 104A1, 104A4 to 104B3 and from node 104A5 to node 104B4. What this means is that there exists a property hasCPE of node 104A5 whose value is CPE-ID 4.

Explained further, the value of predicate or property hasCPE of node 104A5 contains a URI/IRI that points to node 104B4 representing CPE-ID 4. This CPE-ID 4 identifies a particular technology or trait that is known to have a vulnerability identified by CVE-ID 5 of node 104A5. The same CPE-ID 4 is used by target identified by target-ID 1 of node 108A as per the hasCPE predicate shown. In a similar fashion, the value of predicate/property aOCVEWith (shortened from appearsOnCVEWith in FIG. 3 to avoid clutter) of node 104B3 has a URI/IRI containing the address of node 104C2 representing CWE-ID 2, and so on.

The edges defined by the above predicates/properties are not explicitly marked by reference numerals in FIG. 3 for reasons of clarity. The RDF triple of subject, predicate, object: CPE-ID-B, appearsOnCVEWith, CWE-ID-C as loaded into graph 102 indicates that CPE-ID-B appears in a CVE node with a given CVE-ID-A, for example. This indicates that a vulnerability identified by CVE-ID-A is known to exist in the technology/product identified by CPE-ID-B. Moreover, the same CVE node also contains a known weakness as identified by CWE-ID-C that can cause the vulnerability identified by CVE-ID-A.

Explained further, the predicate appearsOnCVEWith links ontology CPE 104B to ontology CWE 104C via ontology CVE 104A. appearsOnCveWith links a product (CPE) and weakness (CWE) through known vulnerabilities (CVE). The CVE (the vulnerability) is the entity that links a CPE (the product) to a CWE (the weakness) and ultimately to a VRT (the vulnerability class). The computation of appearsOnCveWith link will be further discussed below.

Also shown in FIG. 3 are three targets inserted at run-time and the CPE nodes that they are pointing to, identifying the technologies used by them. One of these targets, 108A with a target-ID of 1, was originally provided by user 116 via user interface 122 of FIG. 1. However, targets 108B and 108C with target-IDs of 2 and 3 respectively, were discovered by optional discoverer or discovery module 112 of a preferred embodiment. In the manner described above, our graph database 102 of FIG. 1-3 is thus loaded with interlinked/linked ontologies 104 during initialization, and with targets 108 at runtime.

Graph or graph database 102 of FIG. 3 contains targets 108A, 108B and 108C that point to CPE-IDs of the traits/technologies used by them. In the preferred embodiment, targets 108A-C are part of bug-bounty programs identified by program-IDs 1 and 2. These program-IDs are linked or related to targets 108A-C via links/predicates/relationships isTargetOfProgram as shown. As further shown in FIG. 3, targets 108A and 108B belong to bug-bounty program with program-ID 1 of node 106A and target 108C belongs to bug-bounty program with program-ID 2 of node 106B.

Referring again to FIG. 1, let us now take an even more detailed look at the various modules/subsystems of our vulnerability prediction system 100. In the preferred embodiment, discovery module 112 uses an attack surface mapping tool, preferably OWASP Amass™. Alternatively, it uses any other suitable attack surface mapping tool, in order to resolve or expand targets 108 specified by user 116 via user interface 122.

In order to accomplish its objectives, the attack surface mapping tool may use techniques such as DNS enumeration and other related techniques known in the art, including DNS brute forcing, reverse DNS sweeping, subdomain name alterations/permutations, zone transfers, scraping, using digital certificates, active pulls, APIs, consulting web archives, etc. Therefore, this tool can be used to create a broad attack surface. An attack surface represents the overall collection of assets or points or attack vectors using which, an adversary or a hacker or an unauthorized user can try to attack the system. The adversary may do so for a variety of purposes including denial of service (DoS) attacks, data exfiltration, fraud, phishing, etc. or any other unauthorized or criminal activity.

In the context of the present invention, we will use the notion of an attack surface to mean the collection of all observable assets 108 in which cybersecurity vulnerabilities 120 are to be predicted. Per above, these target assets/observables 108 or simply assets or targets 108 may be directly entered into system 100 by user 116 via user interface 122, and/or extended/discovered thereafter by discovery module 112 into a collection of assets 108A-Z that are entered at run-time into graph database 102 of FIG. 1-3.

In one embodiment, before predicting vulnerabilities 120 in the targets discovered by discovery tool 112, the system acquires the permission of customer/user 116. This is because the customer typically grants permission to access the originally inputted/supplied target, however the permission to access those targets discovered by the discovery module may not have been granted. Such a permission may be obtained by a direct response to a question posed by the system or off-line.

In any case, at this juncture, profiler module 114 is used to collect traits or technologies 110 used by assets 108. These are then linked to their respective targets in graph database 102 based on the bctargetv:hasCPE predicate per above teachings. Each of these traits 110 is identified by a CPE-ID. Ontology CPE 104A contains the CPE-IDs of technologies in graph 102. A profiled trait for an asset or observable 108 is also a technology, and identifiable by a CPE-ID. By linking a trait to its target or vice versa we mean linking the target for which a trait with a given CPE-ID was profiled, to the CPE node with the same CPE-ID that already exists in the graph. This is accomplished based on bctargetv:hasCPE predicate/link per above.

Let us now focus on the workings of profiling module or profiler 114 shown in FIG. 1. Profiler 114 accomplishes its objectives in an automated manner by preferably utilizing a profiling tool such as Wappalyzer™ by AliasIO. Wappalyzer™ takes as input a website URL or a company name and then generates a categorized list of various technologies that it finds being used at the website or the company. It inspects HTML, scripts, cookies and network requests and certificates of pages visited, looking for unique technology fingerprints.

Exemplary collection/list of technologies or properties or traits 110 of an asset amongst assets 108 of FIG. 1 collected by Wappalyzer™ and respective categories for a fictitious website www.example.org are presented below:

CMS: WordPress

Widget: Facebook, LinkedIn, Twitter

Analytics: comScore, Google Analytics UA, SiteCatalyst

Blog: WordPress

JavaScript Framework: jQuery, Hogan.js, Modernizr, YUI

Captcha: reCAPTCHA

Web Framework: Twitter Bootstrap

Per above, these traits 110 are also linked to their targets in graph database 102 at run-time. This is done by linking or pointing the target nodes to the corresponding CPE nodes with the same CPE-IDs as the CPE-IDs of the profiled traits, and based on bctargetv:hasCPE predicate/link per above. Now, we are ready to query database 102 for automatically predicting vulnerabilities in assets 108 based on their profiled and linked traits 110.

Graph database 102 is preferably AWS™ Neptune, Apache Fuseki™, Neo4j™, or any other suitable graph database. The query language may be Protocol and RDF Query Language (SPARQL), graph query language (GQL), Cypher™, SPASQL™, Apache™ TinkerPop Gremlin, or any other graph query language suitable for graph database 102. In the preferred embodiment, query engine/module 118 of FIG. 1 executes SPARQL queries on database 102. In the same or related embodiment, query engine/module 118 is the same as or integrated with user interface 122. An exemplary SPARQL query 1 for our graph database 102 of FIG. 1-3 is provided below:

Note: The exemplary code provided in SPARQL queries below and the computer program listings appendix, may refer to the terms/identifiers of CPE-ID, CVE-ID, CWE-ID and VRT-ID as CPEid/cpeid, CVEid/cveid, CWEid/cweid and VRTid respectively.

---

Exemplary SPARQL Query 1:

```
PREFIX be: <https://id.multiverse.a.bugcrowd.com/bc/>
PREFIX betargetv: <https://id.multiverse.a.bugcrowd.com/bc/Target#>
PREFIX betarget: <https://id.multiverse.a.bugcrowd.com/bc/Target/>
PREFIX epe: <http://w3id.Org/sepses/vocab/ref/cpe#>
SELECT DISTINCT ?cpeId
WHERE {
  VALUES ?target { betarget:1f8d708b-89b6-4fd0-92fc-8d0769184386 }
  ?target a bc:Observable ;
     bctargetv: hasCPEIdDiscoveredByWappalyzer ?cpeId.
}
```
---

The above query is for a specific target, exemplarily identified by the identifier 1f8d708b-89b6-4fd0-92fc-8d0769184386. The output from the above query from an exemplary implementation is presented below:

| Profiled Traits for target |
| 1f8d708b-89b6-4fd0-92fc-8d0769184386: |

| | |
|---|---|
| 1 | cpe:/a:jquery:jquery |
| 2 | cpe:/a:php:php |
| 3 | cpe:/a:wordpress:wordpress |
| 4 | cpe:/a:mysql:mysql |
| 5 | cpe:/a:mariadb_project:mariadb |
| 6 | cpe:/a:nginx:nginx |

Now, a SPARQL query for an exemplary implementation against graph database 102 for technology/trait CPE-ID a:wordpress:wordpress retrieved above, is presented below:

Exemplary SPARQL Query 2:

```
PREFIX cpe: <http://w3id.Org/sepses/vocab/ref/cpe#>
PREFIX cve: <http://w3id.Org/sepses/vocab/ref/cve#>
PREFIX cwe: <http://w3id.Org/sepses/vocab/ref/cwe#>
PREFIX skos: <http://www.w3.Org/2004/02/skos/core#>
SELECT DISTINCT ?vrtLabel
WHERE {
  VALUES ?cpeQuery { "cpe:/a:wordpress" }
  ?cpe cpe:id ?cpeId .
  FILTER strstarts(?cpeId, ?cpeQuery)
  ?cve cve:hasCPE ?cpe ;
     cve:hasCWE ?cwe .
  ?cwe skos:closeMatch ?vrt .
  ?vrt skos:prefLabel ?vrtLabel .
}
```

The output of the above query listing the predicted vulnerabilities 120, and more specifically predicted vulnerability classes 120 of FIG. 1, for product Wordpress™ is given below. The output contains VRT vulnerability class from column 2 as well as vulnerability name from column 3 and information from column 4 as applicable, from Table 2 presented above.

| Predicted vulnerability classes for a:wordpress:wordpress: |
|---|
| 1 Network Security Misconfiguration |
| 2 Insufficient Security Configurability |
| 3 Server Security Misconfiguration |
| 4 Server Security Misconfiguration > OAuth Misconfiguration > Missing/Broken State Parameter |
| 5 Server Security Misconfiguration > OAuth Misconfiguration > Insecure Redirect URI |
| 6 Unvalidated Redirects and Forwards |
| 7 Unvalidated Redirects and Forwards > Open Redirect |
| 8 Server-Side Injection > Server-Side Template Injection (SSTI) |
| 9 Server-Side Injection > Remote Code Execution (RCE) |
| 10 Sensitive Data Exposure > Disclosure of Known Public Information |
| 11 Sensitive Data Exposure > Non-Sensitive Token in URL |
| 12 Sensitive Data Exposure > EXIF Geolocation Data Not Stripped From Uploaded Images |
| 13 Broken Access Control (BAC) > Username/Email Enumeration |
| 14 Sensitive Data Exposure > Sensitive Token in URL |
| 15 Sensitive Data Exposure > Token Leakage via Referer |
| 16 Server Security Misconfiguration > Path Traversal |
| 17 Server-Side Injection > SQL Injection |
| 18 Cross-Site Request Forgery (CSRF) |
| 19 Broken Authentication and Session Management > Authentication Bypass |
| 20 Sensitive Data Exposure > Weak Password Reset Implementation |
| 21 Insufficient Security Configurability > Weak Password Reset Implementation |
| 22 Cross-Site Scripting (XSS) |

Thus, as a consequence of the present design, for a collection of one or more target assets 108, one can determine the expected vulnerabilities for the assets per above teachings. Based on the above results, the user thus gains the knowledge that one of their assets (1f8d708b-89b6-4fd0-92fc-8d0769184386) may contain the above vulnerabilities, and can thus take proactive actions to protect against these vulnerabilities. The present design thus provides an automatic infrastructure that merely starting from an initial target produces a list of eventual vulnerability classes and/or weaknesses per present teachings.

In a highly preferred embodiment, vulnerability prediction system/platform/infrastructure 100 is used in a bug-bounty program. In such an embodiment, the user or customer of the bug-bounty program defines the bug-bounty program for internet-connected assets as specific targets (for example, www.example.com) or preferably using wildcard targets (for example, *.example.com). These targets are entered by user 116 via user interface 122 and then expanded by discovery module 112 per above teachings into assets 108A-N, and then entered into graph database 102.

Also, per above, profiler module 114 now takes these assets 108 as input and determines the technologies or properties or traits used to run and/or implement or operate the assets. The output of profiler 114 is a list of technologies/traits 110 uniquely identified by their CPE-IDs as well as technologies that may not have a CPE-ID. For now, we will focus on the former scenario when technologies/traits 110 profiled are the ones for which profiler 114 did find CPE-IDs. We will address the later scenario further below in these teachings.

The preferred embodiment of the present technology is implemented as a real-time or near-real-time streaming system/platform or infrastructure. The streaming system is based on messages and utilizes a service-oriented architecture (SOA). Such a design for an instant vulnerability prediction platform/system 200 is illustrated in the architectural diagram of FIG. 4. In such an embodiment, real-time or near-real-time vulnerability prediction system 200 is preferably used in one or more bug-bounty programs.

In this publish/subscribe messages-based architecture, loader/ingester service 218 is responsible for initially loading ontologies 104 of FIG. 1 into graph 220 database per above teachings. The individual ontologies are not explicitly shown in FIG. 4 to avoid detraction from the main principles being taught. Loader service 218 is also responsible for refreshing the ontologies on a periodic basis, or on-demand as needed. In the preferred embodiment, the ontologies loaded by loader service 218 are CVE, CPE, CWE and VRT per above.

Furthermore, loader service 218 also computes the bc:appearsOnCVEWith and skos:closeMatch links/predicates discussed above. Referring first to the graph instance of FIG. 3 of the above teachings, the appearsOnCVEWith predicate links CPE nodes to CWE nodes via CVE nodes. More specifically, each RDF triple with predicate appearOnCVEWith has its subject as the CPE-ID of the CPE node and its object as the CWE-ID of the corresponding CWE node with a CWE-ID that appears in the same CVE node in which the CPE-ID appears.

Exemplarily, in FIG. 3, the CPE-ID 3 of CPE node 104B3 is referred to or appears in CVE node 104A1 with CVE-ID 1 that points to CWE node 104C2. In other words, the hasCPE predicate from CVE node 104A1 points to node 104B3 and hasCWE predicate points to CWE node 104C2. As a result, the subject of an RDF triple with predicate appearOnCVEWith in node 104B3 is set to point to node 104B3 with CPE-ID 3, and the object is set to point to node 104C2 with CWE-ID 2.

In one embodiment, the appearOnCVEWith link is pre-computed for reasons of efficiency. In other words, the RDF triple with predicate appearOnCVEWith is populated for all CPE-IDs to which hasCPE predicate from a CVE node point to, and the hasCWE predicate from the same CVE node points to a CWE node. This link is indicative of the CWE weakness that can cause vulnerability/vulnerabilities that are known to exist in those respective CPE-IDs. As a result of this precomputation, the CVE nodes need not be traversed/consulted at run-time. The SPARQL code for this precomputation is provided below.

| Precomputed appearOnCVEWith SPARQL Query 3: |
| --- |
| PREFIX cpe: <http://w3id.org/sepses/vocab/ref/cpe#><br>PREFIX cve: <http://w3id.org/sepses/vocab/ref/cve#><br>PREFIX cwe: <http://w3id.org/sepses/vocab/ref/cwe#><br>PREFIX bc: <https://id.multiverse.a.bugcrowd.com/bc/><br>WITH <bc:graph:live><br>INSERT {<br>  ?cpe be:appearsOnCveWith ?ewe .<br>}<br>WHERE {<br>  ?cve cve:hasCPE ?cpe ;<br>    cve:hasCWE ?cwe .<br>} |

In alternative embodiments, this link is traversed/determined/followed on the fly at query-time. In other words, when query module 118 executes the SPARQL query against graph database 102 for predicting vulnerabilities 120, the link is followed from a target 108 to a CPE 104B to a CVE 104A to a CWE 104C by the graph database, instead of simply following the precomputed link appearsOnCVEWith/aOCVEWith from CPE 104B to CWE 104C. In a similar manner, a pre-computation of links to the ultimate VRTs 104D can also advantageously be made.

Figure 4:
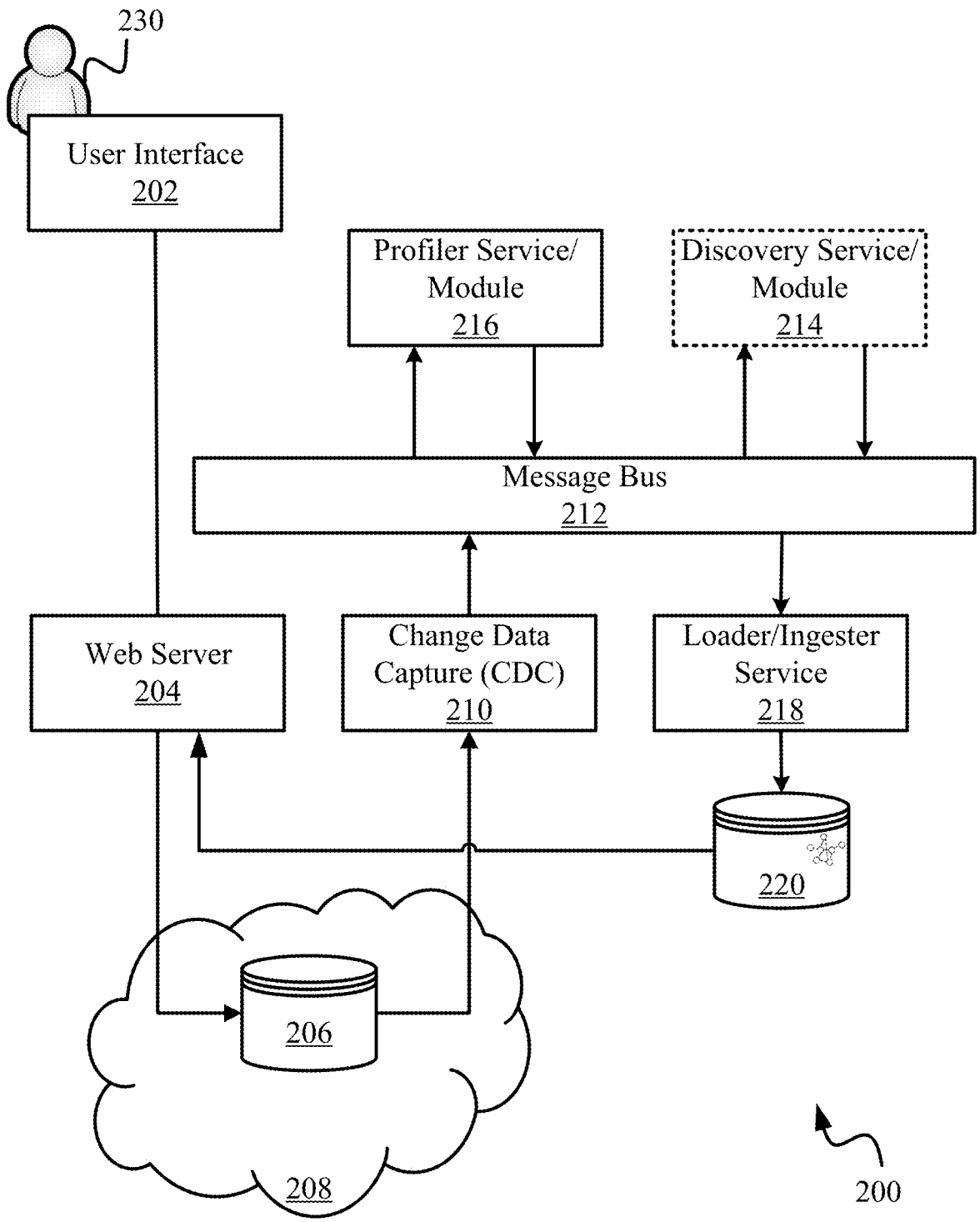
FIG. 4 is an architectural diagram of a service-oriented architecture (SOA) of an instant vulnerability prediction system.

Referring now to FIG. 4, regardless of whether appearOnCVEWith is precomputed or determined on the fly, a customer/user 230 inputs target assets or simply targets or assets for a bug-bounty program via user interface 202. Preferably, user interface 202 is a web-interface working in conjunction with a web-server 204 and a back-end database 206. Preferably, the above architecture utilizes a Ruby on Rails™ implementation backed by an AWS™ Relational Database Service (RDS) using Postgress™ database as back-end database 206. That is why database 206 is shown in cloud 208 in FIG. 4. Alternative technologies/products besides the ones mentioned above are conceivable.

According to the instant principles, there is also a change data capture (CDC) module 210 that is notified by database 206 for any changes in the table(s) that stores the targets entered by the user. As a result, CDC 210 publishes messages on message bus 212 when any new target is entered. Database 206 is preferably a relational database, although it may be any other suitable database against which CDC may be performed. An exemplary implementation of the above architecture utilizes Debezium™ on Kafka Connect™ as CDC Module 210 and AWS™ MSK as message bus 212. When customer/user 230 enters a new target via user interface 202 into database 206, CDC 210 is notified of the creation of this new target. As a consequence, CDC 210 publishes a message on message bus 212 containing the target-ID of the newly entered target as well as the target URL or wildcard specifying the target. The message further contains the program-ID of the bug-bounty program that the target belongs to.

There is also an optional discovery service or module or discoverer 214 as shown by the dotted line in FIG. 4. In a manner analogous to discovery module 112 of FIG. 1, the job of service/module 214 is to discover or expand user provided targets on interface 202 to any other targets or observables related to those targets. This job is known as attack surface mapping based on the above teachings. In the streaming system or SOA embodiment of FIG. 4, service 214 accomplishes its objectives by consuming/subscribing and producing/publishing messages on message bus 212 shown in FIG. 4.

More specifically, discovery service or discoverer 214 consumes the new target messages produced by CDC service 210 on message bus 212. For each new target, it spawns an instance of an attack surface mapping tool (exemplarily, OWASP™ Amass™) and collects the attack surface for that specific target per above teachings. It then produces a new message for each individually discovered target with its new unique target-ID on message bus 212 as well as the URL to the newly detected target. Each such message also has the program-ID linking the discovered target or observable to the bug-bounty program entered by the user. These messages also have the target-ID of the original target for which the attack surface was collected, and which is typically entered by user 230 via user interface 202.

There is also a profiler/profiling service or module 216. In a manner analogous to profiler module 114 of FIG. 1, the job of service/module 216 is to profile the traits of assets entered via user interface 202 and discovered by optional discovery module 214. The outcome of this job is a collection of traits or technologies or products used by the assets, each with an existing CPE-ID (node) in ontology CPE already loaded in the graph database per above. Service 216 accomplishes its objectives by consuming and producing messages on message bus 212 of the SOA architecture shown in FIG. 4.

More specifically, profiler service 216 consumes the new target messages produced by CDC service 210 and optional discovery service 214 on message bus 212. For each new target, it spawns a profiling tool (exemplarily Wappalyzer™), collects its output and produces one or more new messages on message bus 212 corresponding to each technology/trait/product discovered for each target. These trait messages include the target-ID associated with the trait as well as the program-ID that the target belongs to. In addition, if the target was discovered then the messages also include the target-ID of the original target for which the target was discovered.

Now, loader/ingester service/module 218 already introduced above, consumes all of the above messages from message bus 212 and inserts them into a graph database (exemplarily, AWS™ Neptune or Apache Fuseki™). More specifically, service 218 inserts and links into graph database 220 of FIG. 4, in reference to FIG. 1-3, the following entities:

1. Ontologies 104 of prior teachings along with their predicates/links interlinking/linking them, including any precomputation of appearsOnCVEWith predicate/link per above and including skos:closeMatch predicate/link. This step is preferably done during initialization and repeated on a regular basis thereafter.
2. Any new bug-bounty programs as nodes with their unique program-ID. The unique program-ID is preferably automatically generated by the system.
3. Any new targets as entered by customer/user 230 via user interface 202 as nodes. Each such target node has a unique target-ID. It then links these target nodes to program nodes via appropriate RDF triples per above teachings. For instance, in each such target node, it sets the subject of an RDF triple as the target-ID of the target, its predicate as isTargetOfProgram and its object as the program-ID of the respective program. Two such exemplary program nodes 106A and 106B with program-IDs 1 and 2 respectively were shown in our graph database instance of FIG. 3.

4. Any newly discovered targets/observables by discovery service/module 214 per above, and links them to the programs. More specifically, it adds RDF triples in target nodes of the newly discovered targets that define their relationships. For instance, in each target node of the new/discovered target, it sets the subject of an RDF triple as the target-id of the newly discovered target, its predicate as isTargetOfProgram, and its object as the program-id of the bug-bounty program that it was discovered for, and which was entered by the customer/user.

5. Any profiled properties/technologies/traits 110 found by profiler service/module 216. These traits are linked to the targets by inserting or populating the appropriate RDF triples of the target nodes. For instance, in each target node, the service sets the subject of an RDF triple as the target-id of the target, its predicate as hasCPE, and its object as the CPE-ID of the trait/product that was profiled for the target.

6. At this point, we are ready to run queries against our graph database 220. In the preferred embodiment, these queries are written in SPARQL. In the same or related embodiment, these queries are run from a query module which may be the same as or integrated with user interface 202 and the predicted vulnerabilities per above are presented to user 230 on the same user interface in an interactive manner.

Figure 5:
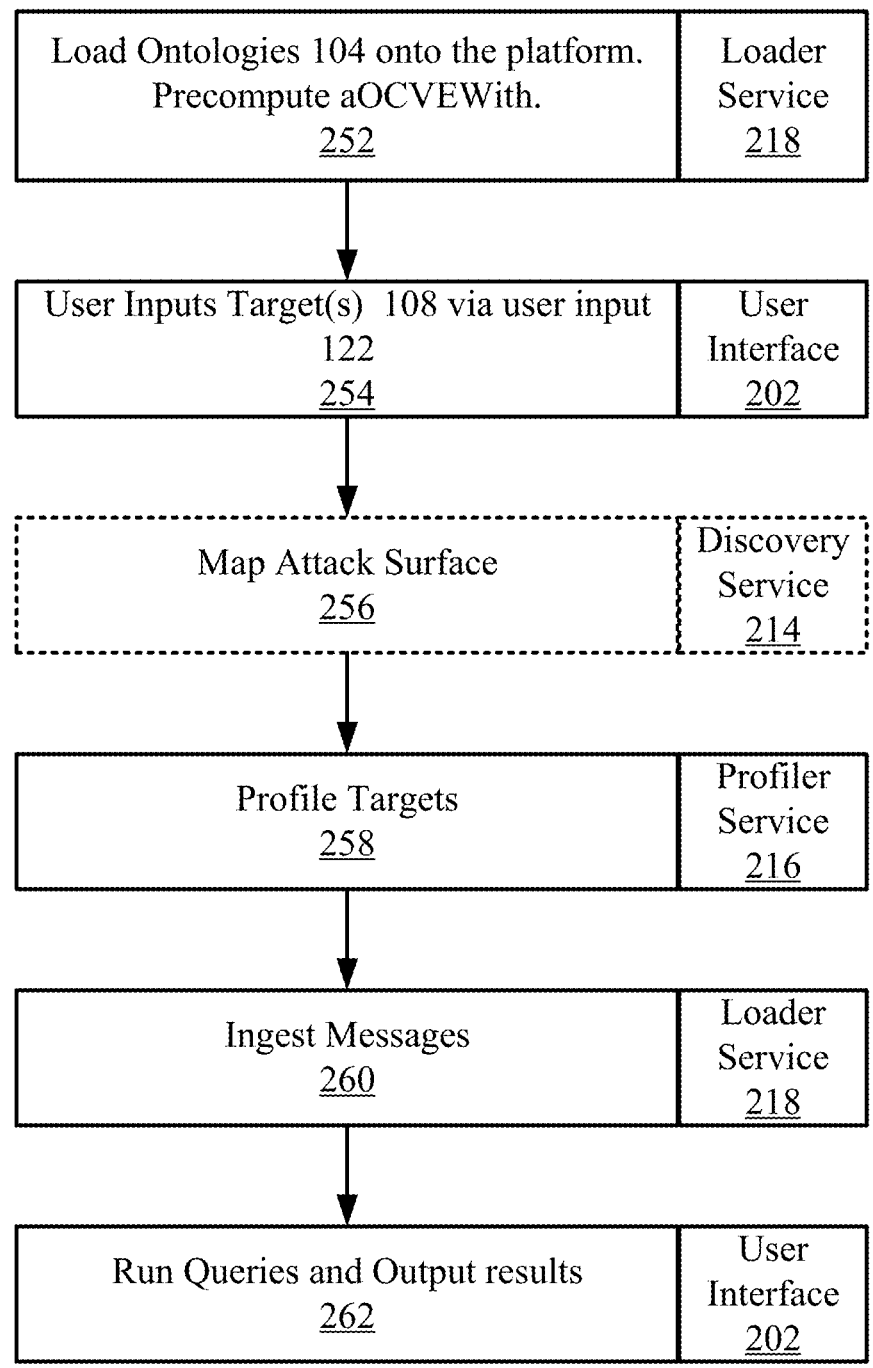
FIG. 5 is a flowchart of the operation of the SOA based design illustrated in FIG. 4.

FIG. 5 represents the operation of the above SOA design of an instant vulnerability prediction system or platform in a flowchart form. Flowchart 250 of FIG. 5 in reference to FIG. 1-4 shows that the process begins with the loading and linking of ontologies 104 during initialization per above teachings. As taught, during initialization, this linking is done via cve:hasCPE, cve:hasCWE and skos:closeMatch links/predicates. Furthermore, bc:appearsOnCVEWith link/predicate may also be precomputed per above. This step is indicated by box/block/step 252, and the specific service/module responsible for this step is loader 218 of FIG. 4.

From this point forward, and during run-time, user 230 enters/inputs targets 108 for a given bug-bounty program via user interface 202. This is shown by step 254. For each new target thus entered, a target message with a target-ID and program-ID is created on message bus 212 per above. An optional discovery service/module 214 maps the attack surface for each target and creates a new target message with a new target-ID for each newly discovered target or observable. Each such message contains the program-ID of the bug-bounty program as well as the target-ID of the original target that the new target is discovered to be or a part of the attack surface of. This optional step 256 is shown in dotted lines along with optional discovery service 214.

Now profiler service 216 collects the technologies or properties or traits of each target as shown by step 258 and creates a new trait message for each new trait/technology/product collected. Each such message has the target-ID for which the trait is collected as well as the program-ID of the bug-bounty to which the target belongs to. This step 258 is carried out by profiler service 216 as shown in flowchart 250. At this stage, loader service 218 ingests all of the above messages and updates/populates our graph database (not explicitly shown in FIG. 5) per above teachings. More specifically, it creates program nodes and target nodes and links them to the ontologies already loaded in the graph. It links the targets to CPE-IDs by populating appropriate RDF triples per above teachings. This is indicated by step 260 in flowchart 250.

As shown by step 262, now the user can run queries against the graph database via user interface 202 and view results. Thus, based on the real-time or near-real-time and automatic architecture of the present technology, the user is able to immediately view the results of vulnerability prediction system by just entering the targets of interest or endpoints via user interface 202.

The user can query the graph database to retrieve predicted vulnerabilities/vulnerability classes for each program and for each target within the program. This information can be displayed to the user in near/real-time as he/she is defining the program by inputting a target 108 via user interface 202. The target may be a domain name, an IT system or a service that exposes an API endpoint for which potential vulnerabilities need to be predicted, or any other accessible endpoint of interest, etc. The user preferably accomplishes specifying the target and obtaining the predicted vulnerability classes via a SPARQL query. Another SPARQL query 4 that accomplishes the above for an exemplary target is provided below:

---
Exemplary SPARQL Query 4:

PREFIX bc: <https://id.multiverse.a.bugcrowd.com/bc/>
PREFIX bctargetv: <https://id.multiverse.a.bugcrowd.com/bc/Target#>
PREFIX bctarget: <https://id.multiverse.a.bugcrowd.com/bc/Target/>
PREFIX epe: <http://w3id.org/sepses/vocab/ref/cpe#>
PREFIX skos: <http://www.w3.Org/2004/02/skos/core#>
SELECT DISTINCT ?vrtLabel
WHERE {
  VALUES ?target { bctarget:1f8d708b-89b6-4fd0-92fc-8d0769184386 }
  ?target a bc:Observable ;
    bctargetv: hasCPEIdDiscoveredByWappalyzer ?targetCPE.
  ?cpe cpe:id ?cpeId .
  FILTER strstarts(?cpeId, ?targetCPE)
  ?cpe be:appearsOnCveWith ?cwe .
  ?cwe skos:closeMatch ?vrt .
  ?vrt skos:prefLabel ?vrtLabel .
}
---

Like query 1, the above query is also for a specific target exemplarily identified by the identifier 1f8d708b-89b6-4fd0-92fc-8d0769184386. The output from the above query for an exemplary implementation is presented below:

---
Predicted vulnerability classes for target 1f8d708b-89b6-4fd0-92fc-8d0769184386:

1  Network Security Misconfiguration
2  Server Security Misconfiguration
3  Server Security Misconfiguration > OAuth Misconfiguration > Insecure Redirect URI
4  Broken Access Control (BAC) > Username/Email Enumeration
5  Insufficient Security Configurability
6  Application-Level Denial-of-Service (DoS)
7  Server Security Misconfiguration > OAuth Misconfiguration > Missing/Broken State Parameter
8  Server Security Misconfiguration > SSL Attack (BREACH, POODLE etc.)
9  Sensitive Data Exposure > Disclosure of Known Public Information
10 Sensitive Data Exposure
11 Sensitive Data Exposure > EXIF Geolocation Data Not Stripped From Uploaded Images
12 Sensitive Data Exposure
13 Sensitive Data Exposure > Token Leakage via Referer
14 Server Security Misconfiguration > Path Traversal
15 Broken Cryptography
16 Server Security Misconfiguration > Race Condition -continued Predicted vulnerability classes for target 1f8d708b-89b6-4fd0-92fc-8d0769184386:

17  Cross-Site Request Forgery (CSRF)
18  Cross-Site Scripting (XSS)
19  Unvalidated Redirects and Forwards
20  Unvalidated Redirects and Forwards > Open Redirect
21  Server-Side Injection > Server-Side Injection (SSTI)
22  Server-Side Injection > Remote Code Execution (RCE)
23  Broken Authentication and Session Management > Authentication Bypass
24  Server-Side Injection > SQL Injection
25  Sensitive Data Exposure > Weak Password Reset Implementation
26  Insufficient Security Configurability > Weak Password Reset Implementation As a consequence of the present design, a user of the instant system can fully automatically and in real-time or in near-real-time be provided with potential attack vectors, vulnerabilities along with severity levels of the vulnerabilities and potential remedies. If the severity and risk of the predicted potential vulnerabilities is not deemed acceptable, security engineers can focus their efforts towards specific assets and vulnerabilities.

Embodiments with a Schedular-Based Design/Architecture.

While some preferred embodiments of the present technology utilize a real-time or near-real-time streaming system design based on SOA as taught above, an alternative set of embodiments use a worker/schedular architecture that executes jobs or tasks. Let us now understand the workings of these present embodiments in concert with the flowchart shown in FIG. 6.

In the present embodiments also, there is a graph database that is loaded with various ontologies at least one of which contains vulnerabilities or vulnerability information of various technologies or products. Like prior embodiments, this graph database may be loaded at initialization by a loader job/task and refreshed on a regular basis thereafter. Preferably, these ontologies are linked together via cve:hasCPE, cve:hasCWE, skos:closeMatch links of the prior teachings. Furthermore, they are preferably linked via precomputed bc:appearsOnCVEWith predicates/links of also the prior teachings. This step is indicated by box/step 302 shown in flowchart 300 along with loader job 304 that is responsible for it.

Now, as shown by step 306, for each original target entered by the user by an appropriate user interface 308, a discovery job 312 is scheduled for discovering additional assets or observables underlying the original target asset. Recall from prior embodiments, that this process shown by step 310, is referred to as attack surface mapping and preferably performed by an attack surface mapping tool, such as OWASP™ Amass™. In a manner analogous to prior embodiments, discovery job 312 is an optional process as shown by the dotted line around step 310 and discovery job 312. Since there is no message bus in these embodiments, the discovery job is scheduled by batch job 322 at the backend of user interface 308 in response to user input at step 306. Batch job 322 will be discussed further below.

Furthermore, for each original and discovered target, a profiler job 316 is scheduled analogously to the profilers of the prior embodiments. The profiler job preferably uses a profiling tool, exemplarily Wappalyzer™, to collect the traits/technologies for each target/observable as shown by step 314. Again, since there is no message bus in these embodiments, the profiling jobs also get scheduled by batch job 322 (to be discussed further below), in response to user input and to the output of discovery process 312.

After the conclusion of profiling, the original and discovered target(s)/observable(s) as well as their traits are entered into the graph database by loader job 304 based on prior teachings, and as shown by step 318. The profiling job/process communicates directly with the loader process, preferably by means of an API. Alternatively, the loading of targets and traits into the graph database may be performed by profiler job 316 itself.

Figure 6:
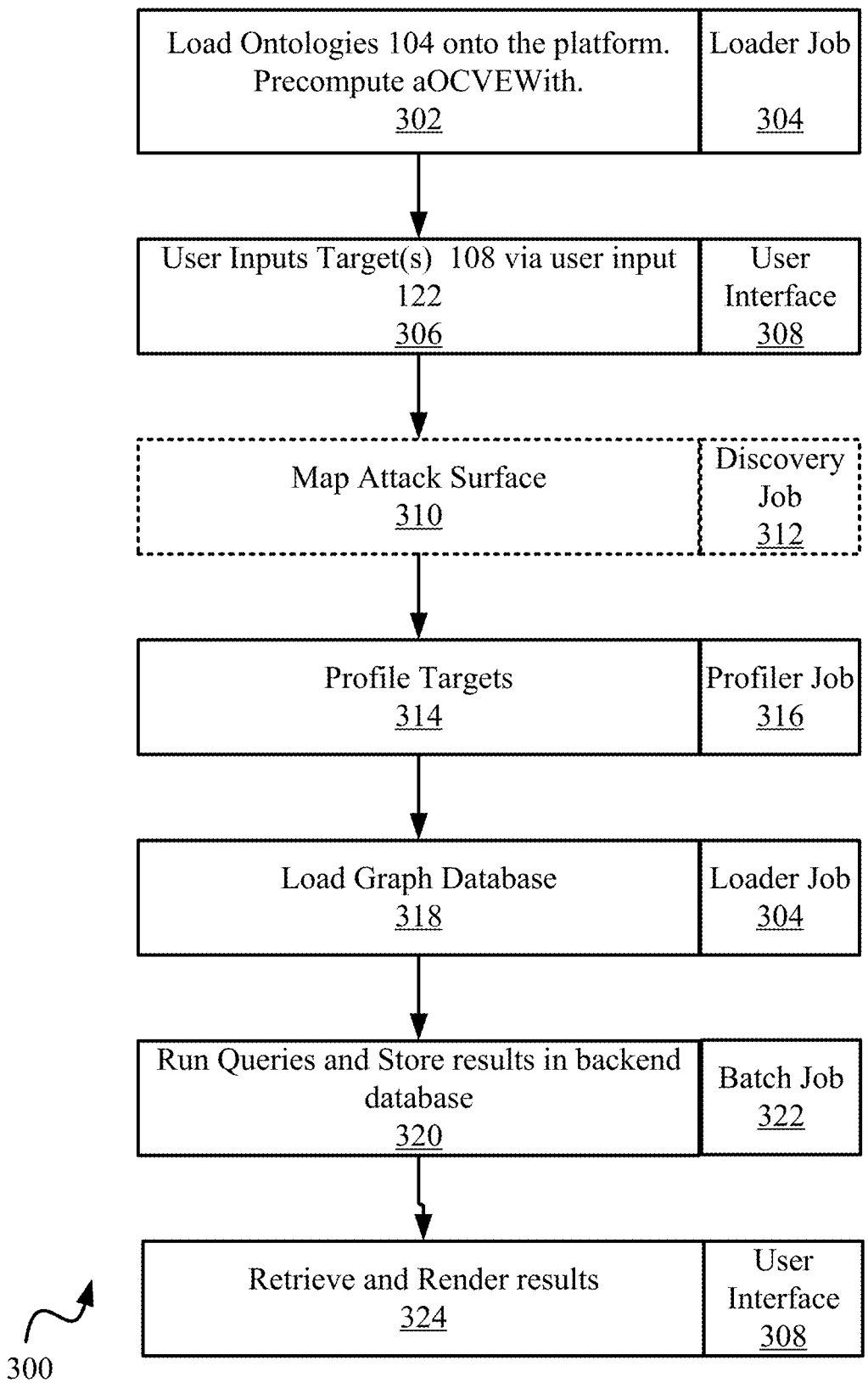
FIG. 6 is a flowchart of the operation of a schedular-based design of an instant vulnerability prediction system.

Instead of a real-time/near real-time architecture of the embodiments of FIG. 4-5, the scheduler-based design of the present embodiments is preferably implemented with a system that periodically (e.g., nightly) checks the backend database, for new targets provided by a customer and processes these through the above steps in a batched implementation. The backend database is preferably a relational database in such a design, although it may be any other type of suitable database. FIG. 6 also shows batch job 322 that is responsible for this periodic/nightly monitoring and analytics performed in steps 310, 314 and 318 per above. Preferably, the present embodiments use Sidekig™ written in Ruby™ as schedular 322 for job scheduling and execution.

As an optimization step for reducing the load on the graph database, after the above monitoring/analysis is completed, the relevant SPARQL queries are executed only once by batch job 322 and as shown by step 320. The results of the query are then stored in the backend database as also per step 320, from where they can be retrieved by the user and rendered via user interface 308 as needed. This last step is shown by box/block/step 324 in flowchart 300.

Embodiments with an API-Based Design/Architecture:

In yet another variation of the present technology, and unlike the SOA embodiments of FIG. 4 that utilize a message bus 212 for communication between various services, or the schedular-based embodiments explained above, the various functions/modules of the automatic vulnerabilities prediction system communicate via function calls or application program interface (API) calls.

Explained further, in these embodiments, the backend of the user interface calls the API endpoint that launches the optional attack surface discovery tool. In turn at its conclusion, the attack surface mapping tool calls the API endpoint of the profiling tool for launching instance/instances of the profiling tool, and which at its/their conclusion in turn call the API endpoint for inserting the above targets/observables and traits in the graph database. In variations where the discovery tool is not used, the backend of the user interface itself calls the API endpoint for launching the profiler tool instance(s). The user then queries the graph database per above teachings to predict vulnerabilities in the target(s).

Enhancements for Missing CPE-IDs:

As noted earlier in the above embodiments, the profiling tool collects traits/technologies operated/used/implemented by assets or observables. On often occasions, these collected traits have CPE-IDs that are available to the profiling tool as their properties. However, a CPE-ID is not always available as a property of a technology/trait collected by the profiler tool. Therefore, as another innovation of the present design, a text-based match is implemented to find the relevant known vulnerabilities (CVEs) for a specific technology. This search is performed in our graph database on known technologies which do have CPE-IDs and that are linked to specific targets via their hasCPE property per above teachings.

Explained further, if a new or unknown technology/trait without a CPE-ID is discovered for a target, the graph database is first searched to see if that technology has been encountered before. This is done by text-matching the names and other properties of the unknown technology against the names and other properties of the known technologies/traits with known CPE-IDs in the graph and that may already be linked to targets. If a match is found, then the new/unknown technology/trait is linked to its target with the CPE-ID just looked up based on the hasCPE predicate and CPE-ID per prior teachings. In other words, the CPE-ID of the matched known technology in the graph is set to the CPE-ID of the unknown technology. Based on prior teachings, the vulnerabilities and weaknesses of the new unknown technology thus become known.

However, if a match is not found, then the unknown technology is added to a collection of unknown technologies. Now, as our vulnerability prediction system operates over time, more and more technologies with known CPE-IDs are entered into the graph database. The above matching process is then periodically run to update the CPE-IDs for the unknown technologies, based on known CPE-IDs already in the graph. This batch update of linksets is analogous to the precomputation of the appearsOnCveWith predicate/link taught above. This process can be automated with a tool, such as Silk™ by University of Mannheim.

Figure 7:
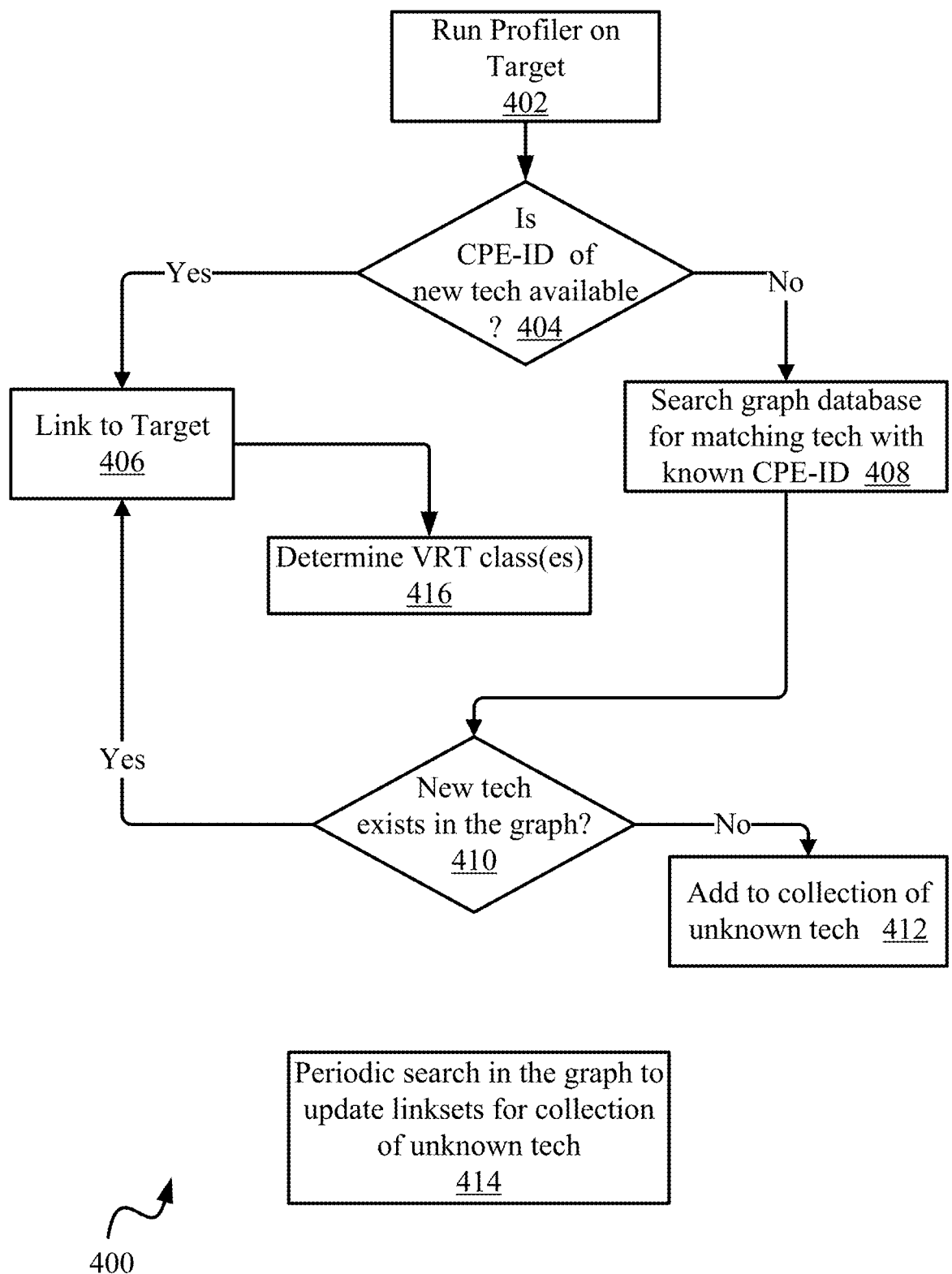
FIG. 7 is a flowchart of an enhancement for a scenario when the profiler encounters a trait of an asset without a CPE-ID.

The algorithm for the above enhancement is shown in FIG. 7. As shown by step 402, the profiling tool or profiler is run for a target for which it collects the profiled traits or technologies. For any such technology collected, a check is first made to see if there is a CPE-ID of the new technology that was profiled by the profiler. This is done by checking the various properties of the technology as collected by the profiling tool. This check is shown by decision diamond 404. If the CPE-ID is known, it is simply linked to the target per above teachings and as shown by step 406.

On the other hand, if the CPE-ID is unknown per decision diamond 404, then the instant graph database, such as database 102 of FIG. 1-5, is searched to see if there is a match of the new or unknown technology. This text search is shown by step 408 and the check for determining if a match exists is shown by decision diamond 410. If a match exists, then the new technology is assigned the existing CPE-ID, and is then linked to the target as shown by box 406. Now the corresponding VRT class(es) for the new technology can be determined per above teachings and as shown by box/step 416. However, if no match is found, then the new unknown technology/trait is added to the collection of unknown technology as shown by step/box 412.

As the instant vulnerability prediction platform operates, new targets are added to the graph database with new technologies that may have known CPE-IDs. Therefore, as shown by process box 414, a process is periodically run that performs the above matching/searching on a periodic/scheduled bases. If/when new matches are found, then the CPE-IDs of unknown technologies are updated based on the CPE-IDs of the known technologies, and they are then linked to their respective targets per above discussion. In this manner, the graph database is kept up-to-date by keeping as many technologies in the graph updated and linked per their CPE-IDs as feasible.

Figure 8:
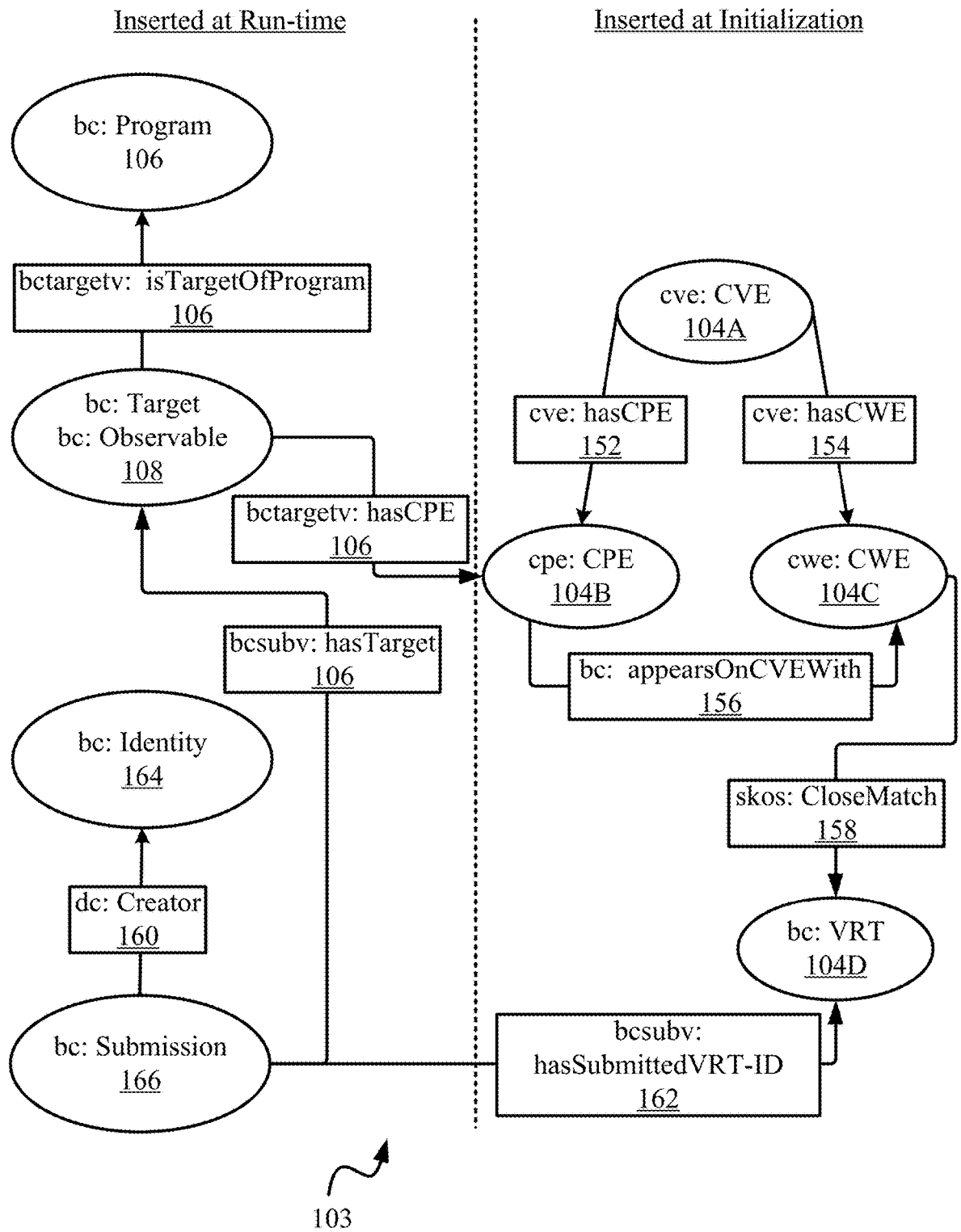
FIG. 8 is a variation of the conceptual diagram of the graph database of FIG. 2, including researchers/experts and their submissions.

Assignment of Bug-Bounty Researchers/Experts:

The present technology is further extended to assign researchers or experts in a bug-bounty program to specific targets based on the traits or skills of those researchers in specific technologies. A variation of the conceptual diagram of our graph database 102 of FIG. 1-3 containing additional entities for researchers and their submissions, is presented in FIG. 8. Graph database 103 shown in FIG. 8 is an extension of the graph database 102 of FIG. 1-3.

Graph 103 shows additional nodes 164 and 166 in the namespace be called Identity and Submission respectively. Similarly, the graph also shows an additional node 162 in namespace bsubv. Edge or relationship 160 identified by the predicate creator in namespace dc indicates that a given submission 166 was created or entered into the system by a researcher identified by identity 164. In a similar fashion, edge or relationship 162 defined by predicate hasSubmittedVRTid in namespace bsubv indicates that submission 166 has been identified by the researcher to contain a vulnerability that falls in a specific vulnerability class identified by a VRT node in ontology VRT 104D. Exemplary VRT nodes 104D7 and 104D representing exemplary VRT vulnerabilities/vulnerability classes were discussed in relation to FIG. 3 of the prior embodiments.

Submission 166 created by researcher (with identity) 164 is indicative of the skills/traits of the researcher for a specific class of vulnerabilities as identified by the specific VRT under which the vulnerability disclosed in submission 166 falls. This information is used by subsequent queries against graph database 103 to identify and assign relevant researchers to targets per below explanation. Analogously to the conceptual diagram of graph 102 of FIG. 2 as compared to its actual instance of FIG. 3, it should be understood that a given instance of the conceptual graph 103 of FIG. 8 will also contain many more nodes corresponding to the many researchers 164 and their submissions 166 as identified by respective creator and hasSubmittedVRTid relationships/links.

Now, a SPARQL query 5 for an exemplary implementation that identifies researchers based on matching their skills or traits to the various technologies being used by a target of a bug-bounty program is presented below.

---

Exemplary SPARQL Query 5:

```
PREFIX bctargetv: <https://id.multiverse.a.bugcrowd.com/bc/Target#>
PREFIX bctarget: <https://id.multiverse.a.bugcrowd.com/bc/Target/>
PREFIX bcsubv: <https://id.multiverse.a.bugcrowd.com/bc/Submission#>
PREFIX cpe: <http://w3id.org/sepses/vocab/ref/cpe#>
PREFIX cve: <http://w3id.org/sepses/vocab/ref/cve#>
PREFIX cwe: <http://w3id.org/sepses/vocab/ref/cwe#>
PREFIX bc: <https://id.multiverse.a.bugcrowd.com/bc/>
PREFIX skos: <http://www.w3.org/2004/02/skos/core#>
PREFIX dc: <http://purl.org/dc/elements/1.1/>
SELECT DISTINCT ?researcher
WHERE {
  VALUES ?target {bctarget:1f8d708b-89b6-4fd0-92fc-8d0769184386}
  ?target a be:Observable ;
    bctargetv:hasCPEIdDiscoveredByWappalyzer ?targetCPE.
  ?cpe epe:id ?cpeId .
  FILTER strstarts(?cpeId, ?targetCPE)
  ?cpe be:appearsOnCveWith ?cwe .
  ?cwe skos:closeMatch ?vrt .
  ?cpe epe:hasProduct ?product .
  optional {
    ?sub bcsubv:hasSubmittedVRTId ?vrtIdhasSubmittedVRT ?vrt .
    ?sub dc:creator 'researcher .
  }
}
```

---

Like queries 1 and 3, the above query is for a specific target, identified by a unique identifier, exemplarily, 1f8d708b-89b6-4fd0-92fc-8d0769184386. The query retrieves researchers that have submitted vulnerabilities in the same class as the ones being predicted for a specific target based on the described analysis and ontologies. These researchers have shown to have the capabilities or skills/ traits needed to find the likely vulnerabilities for the target in question. The output is presented below with the identifiers for the matching fictional researchers:

| Matching researchers for target if 8d708b-89b6-4fd0-92fc-8d0769184386: |
| --- |
| 1  https://id.multiverse.a.bugcrowd.com/bc/Identity/49e6d5d7-ae22-440f-a96f-7090dfld2ba9 |
| 2  https://id.multiverse.a.bugcrowd.com/bc/Identity/8447eeec-51ea-4d80-9dba-472f3a0ed675 |
| 3  https://id.multiverse.a.bugcrowd.com/bc/Identity/8e0d1a5c-9986-4905-8173-511ee25faa51 |
| 4  https://id.multiverse.a.bugcrowd.com/bc/Identity/a4a4c2dc-07b7-4b33-80e6-f223adcb6e02 |
| 5  https://id.multiverse.a.bugcrowd.com/bc/Identity/f6f23642-7551-4810-9ed0-348784256079 |
| 6  https://id.multiverse.a.bugcrowd.com/bc/Identity/15661fc0-9fb9-4776-8baf-ca5ad52e3bd |
| 7  https://id.multiverse.a.bugcrowd.com/bc/Identity/7be81386-c918-439f-928d-el67c93bf7c6 |
| 8  https://id.multiverse.a.bugcrowd.com/bc/Identity/7ff7ad42-4aa4-4802-a203-3dc9ddf9cd0e |
| 9  https://id.multiverse.a.bugcrowd.com/bc/Identity/8If3bb25-a9ee-43de-bee6-elc09dbbf62d |
| 10 https://id.multiverse.a.bugcrowd.com/bc/Identity/cd617222-bd08-4dea-aa72-0951f2cba636 |

To create a graph based on query 5 that shows the links from target to researcher, we can use a similar query that selects the same values, but constructs all followed links. Such a SPARQL query 6 is presented below. The output of query 6 provides useful information, including the name of the target, the specific products detected, the known weaknesses for those products, the vulnerability class (VRT) of those weaknesses and lastly the researchers known to be proficient in exposing those vulnerability classes. Similarly to prior embodiments, above query 5 also uses appearsOnCveWith with its associated functionality taught earlier.

```
Exemplary SPARQL Query 6:

PREFIX bctargetv: <https://id.multiverse.a.bugcrowd.com/bc/Target#>
PREFIX bctarget: <https://id.multiverse.a.bugcrowd.com/bc/Target/>
PREFIX bcsubv: <https://id.multiverse.a.bugcrowd.com/bc/Submission#>
PREFIX cpe: <http://w3id.org/sepses/vocab/ref/cpe#>
PREFIX cve: <http://w3id.org/sepses/vocab/ref/cve#>
PREFIX cwe: <http://w3id.org/sepses/vocab/ref/cwe#>
PREFIX bc: <https://id.multiverse.a.bugcrowd.com/bc/>
PREFIX skos: <http://www.w3.org/2004/02/skos/core#>
PREFIX dc: <http://purl.org/dc/elements/1.1/>
construct {
  ?target rdfs:label "www.bugcrowd.com" ;
    bc:usesProduct ?product .
  ?product cve:hasCWE ?cwe .
  ?ewe bc:cweMapsToVrt ?vrt ; rdfs:label ?cweName .
  ?vrt rdfs: label ?vrtLabel .
  ?vrt be:hasResearcherWhoSubmittedToIt ?researcher .
}
WHERE {
  VALUES ?target { bctarget:lf8d708b-89b6-4fd0-92fc-8d0769184386 }
  ?target a be:Observable ;
    bctargetv:hasCPEIdDiscoveredByWappalyzer ?targetCPE .
  ?cpe epe:id ?cpeId .
  FILTER strstarts(?cpeld, ?targetCPE)
  ?cpe be:appearsOnCveWith ?cwe .
  ?cwe skos:closeMatch ?vrt .
  ?vrt skos: prefLabel ?vrtLabel .
  ?cpe epe:hasProduct ?product .
  ?vrt de:identifier ?vrtld .
  ?sub besubv:hasSubmittedVRTId ?vrtId .
  ?sub de:creator 'researcher .
}
```

Figure 9:
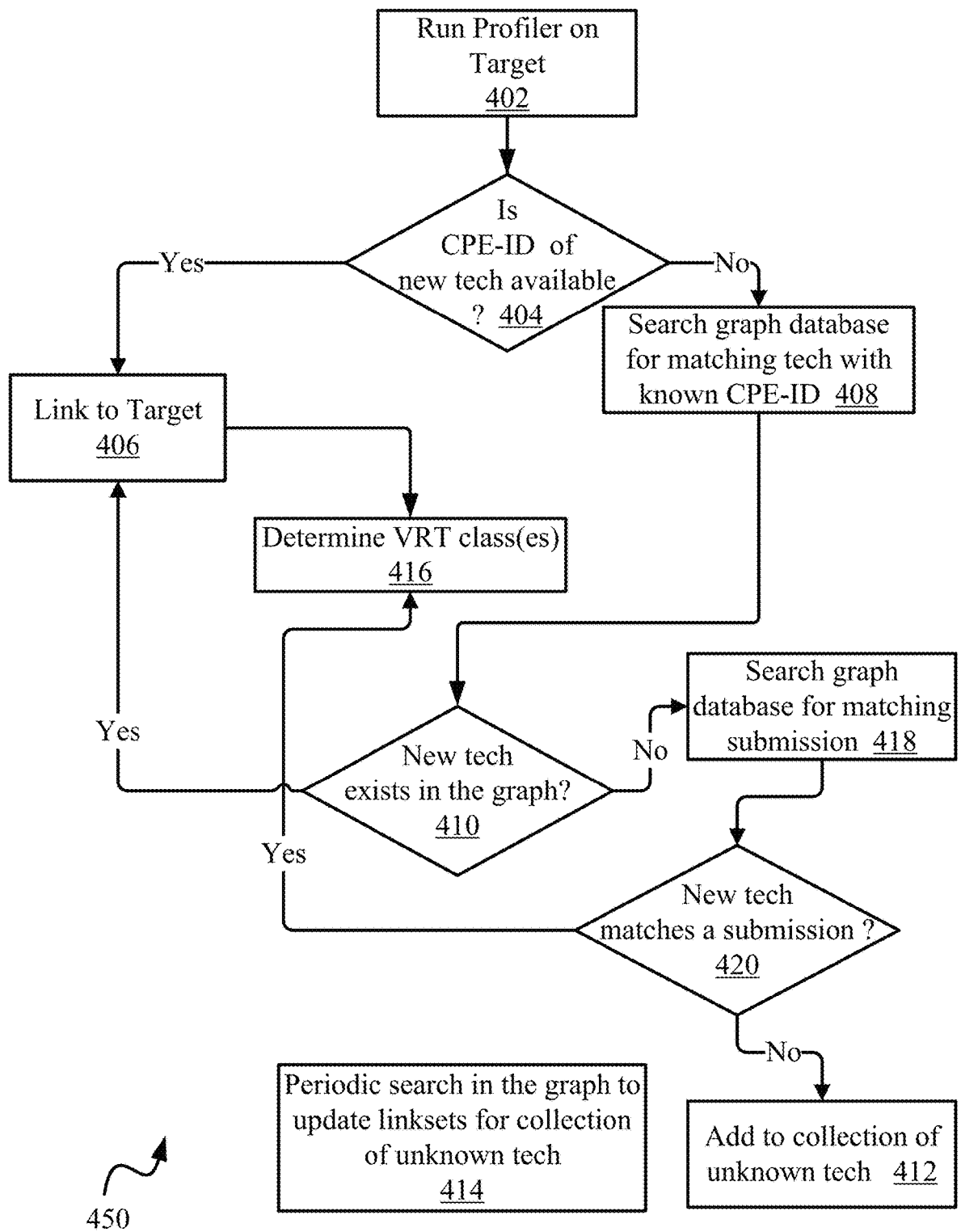
FIG. 9 is a variation of the enhancement of FIG. 7 by searching for matching technologies in the submissions made by the researchers.

Furthermore, as a consequence of the above design, our flowchart of FIG. 7 can now be enhanced to the variation flowchart 450 shown in FIG. 9. In the flowchart of FIG. 9, if the new/unknown technology is not matched against an existing/known technology in the graph per decision diamond 410, it is then searched against existing submissions entered by the researchers based on a text-based search. This is indicated by step 418. Now if a match is found in an existing submission per decision diamond 420, then the VRT class for that new tech/trait becomes known as shown by the Yes arrow from diamond 420 to step 416.

Consequently, this allows our instant vulnerability prediction to predict vulnerabilities that include the new or unknown tech. In such a scenario, an alternate property/properties besides hasCPE of above teachings may be used to link the new tech/trait to the respective target. For example, such a property/predicate may be referred to as bctargetv:hasTraitInASubmission to point a specific target to a technology/trait found in a submission, and property/predicate bc:hasTrait to point a submission to a technology/trait.

Furthermore, existing targets that have been profiled to also have the new/unknown technology can be found, and if an existing target has submissions against it, the VRT of the submission can be predicted to be relevant for the new target as well. Also, the researchers that made the submissions can be predicted to be qualified to make submissions against the new target.

The various systems and methods of the above automatic vulnerability prediction technology are implemented using at least one microprocessor executing computer-readable instructions stored in a non-transitory storage medium and said at least one microprocessor coupled to said storage medium for executing said computer-readable instructions. It is understood that for various embodiments explained above, one or more computers and storage medium may be utilized.

Furthermore, the embodiments herein can include both hardware and software elements. The embodiments that are implemented in software include but are not limited to, firmware, resident software, microcode, etc. The embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, electromagnetic, optical, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk, such as a read only memory (CD-ROM), compact disk, such as a read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, mice, etc.) can be coupled to the system either directly or through intervening I/O controllers. Network adapters may also be coupled to the system to enable the data processing system to become coupled to other data processing systems or remote printers or storage devices through intervening private and/or public network. Modems, cable modem and Ethernet cards, Wi-fi adapters, Bluetooth adapters are just a few of the currently available types of network adapters.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method executing computer-readable instructions by at least one microprocessor, said computer-readable instructions stored in a non-transitory storage medium coupled to said at least one microprocessor, and said computer-implemented method comprising the steps of:
   (a) storing and linking a plurality of ontologies in a graph database, said plurality of ontologies containing vulnerability information about a first plurality of technologies, wherein said plurality of ontologies include a common platform enumeration, a common vulnerabilities and exposures, a common weakness enumeration and a vulnerability rating taxonomy;
   (b) precomputing one or more predicates in said graph database by executing one or more queries in a query language against said graph database;
   (c) collecting a second plurality of technologies for a target and assigning a text identifier to an unknown technology amongst said second plurality of technologies, wherein said unknown technology did not already have an identifier assigned to it, and wherein said text identifier had previously been assigned to a known technology, and wherein said known technology matches said unknown technology based on the names and properties of said known technology and said unknown technology and as result of performing a periodic search in said graph database;
   (d) linking said second plurality of technologies to said target in said graph database;
   (e) using said query language for querying said graph database for automatically predicting one or more cybersecurity vulnerabilities in said target, based on said linking in step (a), said linking in step (c) (d) and said vulnerability information; and
   (f) based on said precomputing, linking said common platform enumeration to said common weakness enumeration via said common vulnerabilities and exposures in said graph database; wherein said linking in steps (a) and (d) employs one or more triples, each of said one or more triples consisting of a subject, a predicate and an object, and wherein said subject and said object correspond to respective nodes and said predicate corresponds to an edge between said respective nodes in said graph database, and wherein said one or more cybersecurity vulnerabilities and their severity levels are provided to a user for implementing one or more remedies for said one or more cybersecurity vulnerabilities.

2. The computer-implemented method of claim 1, discovering said at least one target based on an input provided by said user.

3. The computer-implemented method of claim 2, performing said discovering using an attack surface mapping tool.

4. The computer-implemented method of claim 2, providing said one or more cybersecurity vulnerabilities predicted in said at least one target to comprise of a vulnerability class with a severity rating as specified in said vulnerability rating taxonomy.

5. The computer-implemented method of claim 2, providing said one or more cybersecurity vulnerabilities predicted in said at least one target to comprise of a weakness as specified in said common weakness enumeration.

6. The computer-implemented method of claim 1, wherein said collecting is done by a profiling tool.

7. The computer-implemented method of claim 1, wherein said query language is Protocol and Resource Description Framework Query Language (SPARQL™).

8. The computer-implemented method of claim 1, wherein said asset belongs to a bug-bounty program.

9. The computer-implemented method of claim 1, implemented as a near-real-time streaming system based on a Service Oriented Architecture (SOA), said SOA comprising a message bus, a profiler service, a discovery service, a change data capture (CDC) service and an ingester service.

10. The computer-implemented method of claim 1, implemented using one of a schedular-based architecture and an API-based architecture.

11. A system for predicting automatically at least one cybersecurity vulnerability in a target, said system comprising computer-readable instructions stored in a non-transitory storage medium and at least one microprocessor coupled to said non-transitory storage medium for executing said computer-readable instructions, said system further comprising:
   a) a graph database in which a plurality of ontologies are stored and linked by one or more triples, each of said one or more triples consisting of a subject, a predicate and an object, wherein said subject and said object correspond to respective nodes and said predicate corresponds to an edge between said respective nodes in said graph database, and wherein said plurality of ontologies contain vulnerability information about a first plurality of technologies, and wherein said plurality of ontologies include a common platform enumeration, a common vulnerabilities and exposures, a common weakness enumeration and a vulnerability rating taxonomy;
   (b) a profiler that collects a second plurality of technologies for said target, wherein a text identifier is assigned to an unknown technology amongst said second plurality of technologies, and wherein said unknown technology did not already have an identifier assigned to it, and wherein said text identifier had previously been assigned to a known technology, and wherein said known technology matches said unknown technology based on the names and properties of said known technology and said unknown technology and as result of performing a periodic search in said graph database, and wherein said profiler links said second plurality of technologies to said target in said graph database; and
   (c) a query module that uses a graph database query language for querying said graph database for said predicting; wherein said at least one cybersecurity vulnerability is based on said vulnerability information, and wherein said common platform enumeration is linked to said common weakness enumeration via said common vulnerabilities and exposures in said graph database by one or more predicates, and wherein said one or more predicates are precomputed by executing one or more queries against said graph database, and wherein said one or more queries are written in said graph database query language, and wherein said at least one cybersecurity vulnerability and its severity level are provided to a user for implementing a remedy for said at least one cybersecurity vulnerability.

12. The system of claim 11, further comprising a discoverer for discovering said at least one target based on said user input.

13. The system of claim 12, wherein said discoverer utilizes an attack surface mapping tool.

14. The system of claim 12, wherein said vulnerability information comprises a vulnerability class and a priority as specified in said vulnerability rating taxonomy.

15. The system of claim 11, wherein said profiler employs a profiling tool.

16. The system of claim 11, wherein said query language is Protocol and Resource Description Framework Query Language (SPARQL™).

17. The system of claim 11, implemented as a near-real-time system using a service-oriented architecture (SOA), said SOA comprising a message bus, a profiler service, a discovery service, a change data capture (CDC) service and an ingester service.

18. The system of claim 11, implemented using one of a schedular-based architecture and an API-based architecture.

* * * * *